(12) United States Patent
Koito et al.

(10) Patent No.: US 12,305,829 B2
(45) Date of Patent: May 20, 2025

(54) ILLUMINATION DEVICE AND OPTICAL ELEMENT

(71) Applicant: Japan Display Inc., Tokyo (JP)

(72) Inventors: Takeo Koito, Tokyo (JP); Tae Kurokawa, Tokyo (JP); Kojiro Ikeda, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/373,462

(22) Filed: Sep. 27, 2023

(65) Prior Publication Data

US 2024/0019107 A1 Jan. 18, 2024

Related U.S. Application Data

(63) Continuation of application No. PCT/JP2022/019930, filed on May 11, 2022.

(30) Foreign Application Priority Data

May 21, 2021 (JP) .................................. 2021-086461

(51) Int. Cl.
*F21V 14/00* (2018.01)
*G02F 1/1343* (2006.01)
*G02F 1/1347* (2006.01)

(52) U.S. Cl.
CPC ...... *F21V 14/003* (2013.01); *G02F 1/134309* (2013.01); *G02F 1/1347* (2013.01)

(58) Field of Classification Search
CPC . F21V 14/003; G02F 1/134309; G02F 1/1347
See application file for complete search history.

(56) References Cited

U.S. PATENT DOCUMENTS

| | | | | |
|---|---|---|---|---|
| 5,753,937 A | * | 5/1998 | Shimomaki | G02F 1/1396 349/67 |
| 2019/0131320 A1 | * | 5/2019 | Shin | G02F 1/134336 |
| 2019/0137817 A1 | * | 5/2019 | Yasui | G02F 1/133536 |

FOREIGN PATENT DOCUMENTS

| | | |
|---|---|---|
| JP | H07-333598 A | 12/1995 |
| JP | 2004-062122 A | 2/2004 |

(Continued)

OTHER PUBLICATIONS

International Search Report issued in International Patent Application No. PCT/JP2022/019930 on Jun. 14, 2022 and English translation of same. 5 pages.

(Continued)

*Primary Examiner* — Bryon T Gyllstrom
(74) *Attorney, Agent, or Firm* — K&L Gates LLP

(57) ABSTRACT

Disclosed is an illumination device including a light source, a first liquid crystal cell over the light source, and a second liquid crystal cell over the first liquid crystal cell. Each of the first liquid crystal cell and the second liquid crystal cell includes a first substrate, a plurality of first lower electrodes and a plurality of second lower electrodes driven independently, a first liquid crystal layer, and a second substrate. The first substrate has a first region and a second region. The plurality of first lower electrodes is located over the first region and extends in a column direction. The plurality of second lower electrodes is located over the second region and extends in the column direction. The first liquid crystal layer is located over the plurality of first lower electrodes and the plurality of second lower electrodes. The second substrate is located over the first liquid crystal layer.

21 Claims, 25 Drawing Sheets

(56) References Cited

FOREIGN PATENT DOCUMENTS

| | | |
|---|---|---|
| JP | 2009-145718 A | 7/2009 |
| JP | 2011-044328 A | 3/2011 |

OTHER PUBLICATIONS

Written Opinion issued in International Patent Application No. PCT/JP2022/019930 on Jun. 14, 2022. 3 pages.

* cited by examiner

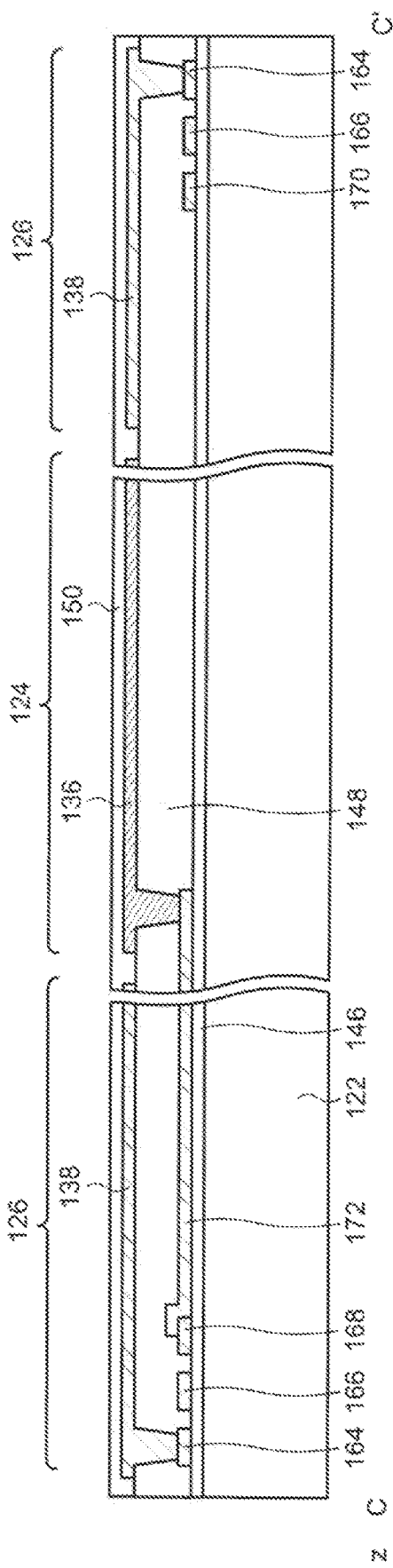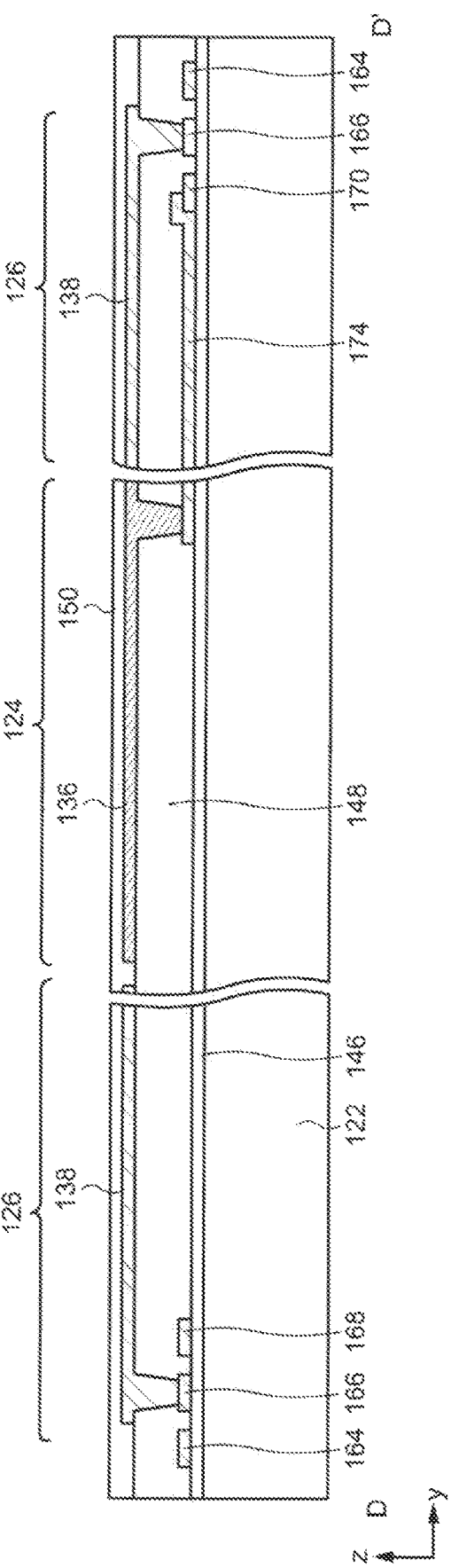

FIG. 14
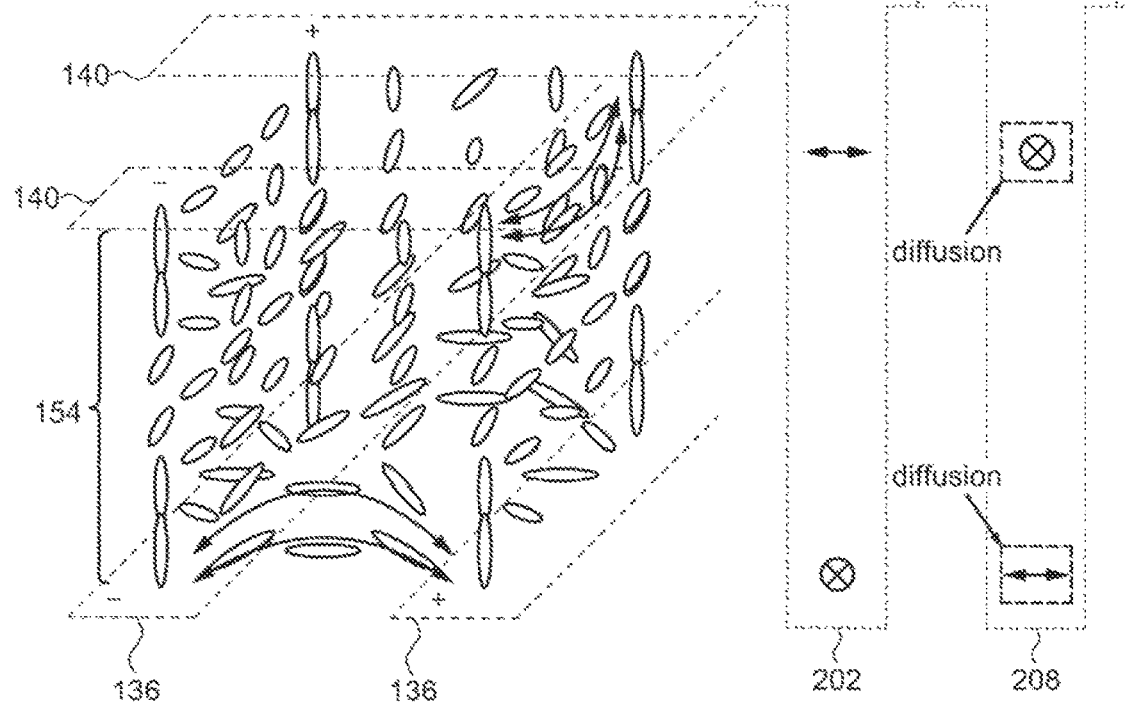
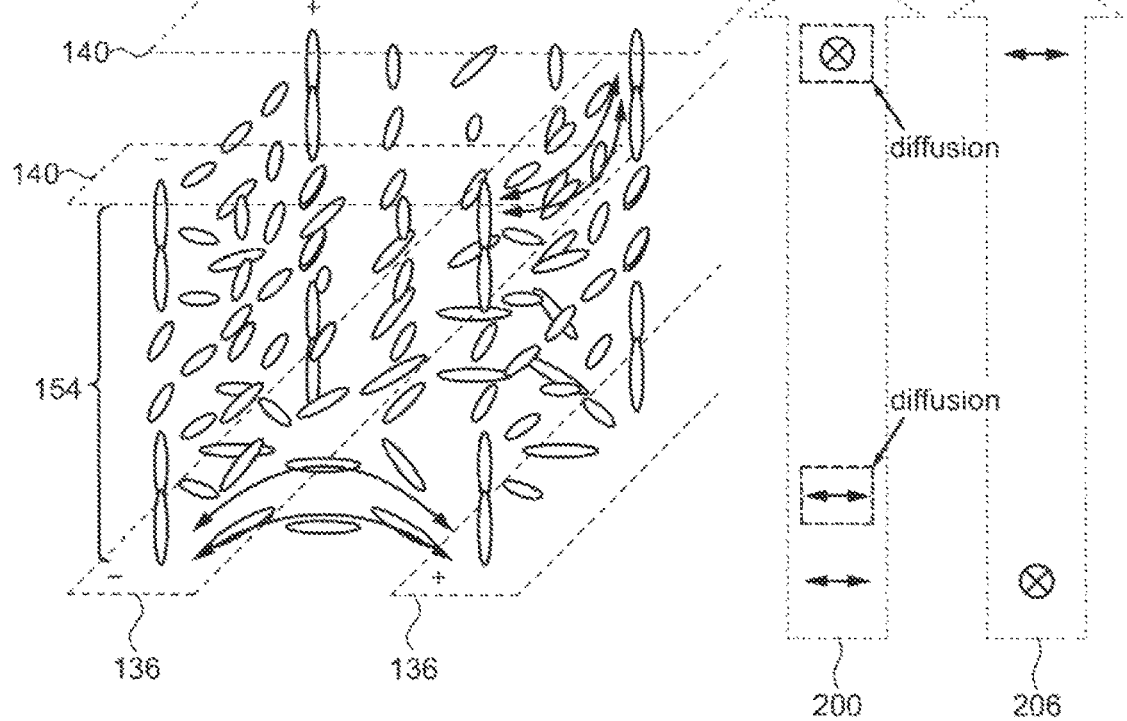
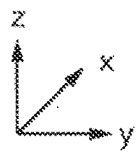

FIG. 25
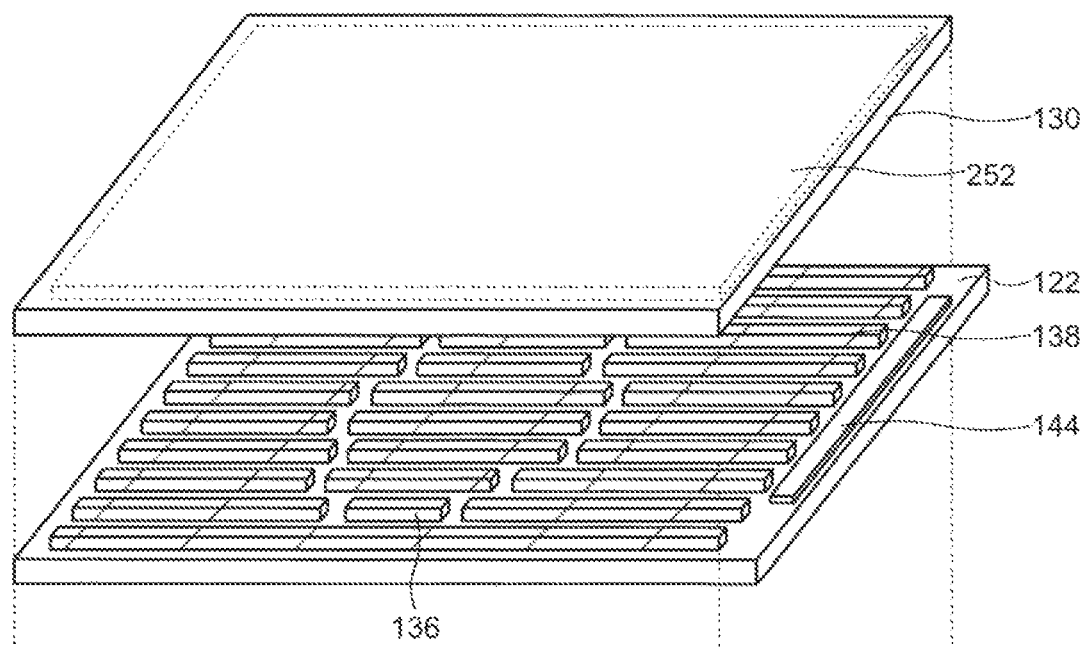
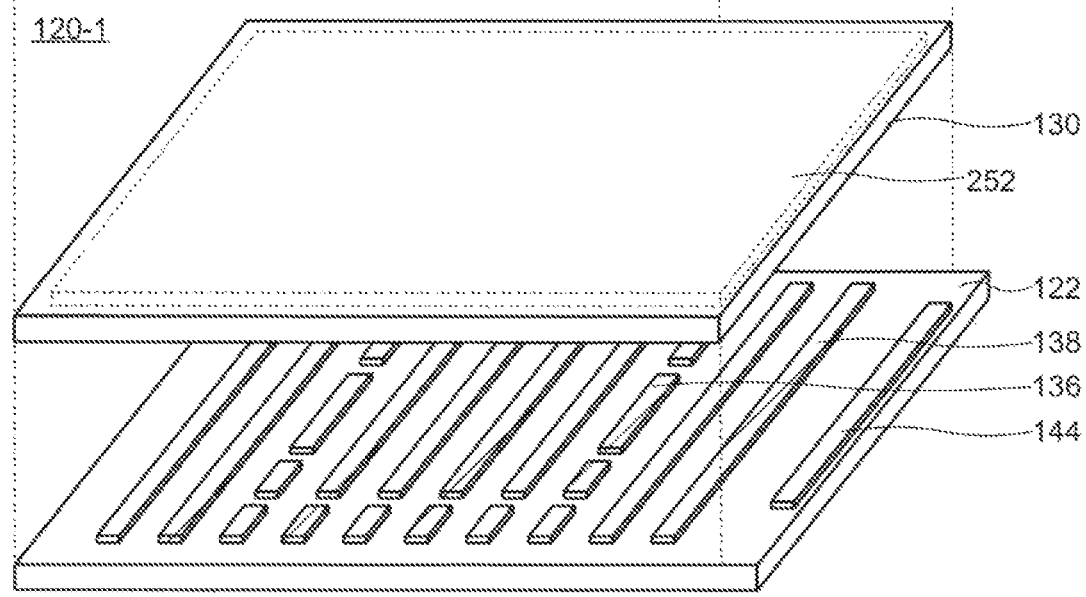

ILLUMINATION DEVICE AND OPTICAL ELEMENT

CROSS-REFERENCE TO RELATED APPLICATIONS

This application is a Continuation of International Patent Application No. PCT/JP2022/019930, filed on May 11, 2022, which claims the benefit of priority to Japanese Patent Application No. 2021-086461, filed on May 21, 2021, the entire contents of which are incorporated herein by reference.

FIELD

An embodiment of the present invention relates to an illumination device and driving method thereof. For example, an embodiment of the present invention relates to an illumination device capable of expressing patterns such as letters and pictures in a light-illuminated area and a driving method thereof.

BACKGROUND

Illumination devices have been known which can express a variety of characters, pictures, and the like on an area illuminated by light from a light source (hereinafter, referred to as an illuminated area) by modulating the light emitted from the light source or by physically shading a part of the light (see, Japanese Patent Application Publications No. 2009-145718, 2004-62122, and 2011-44328).

SUMMARY

An embodiment of the present application is an illumination device. The illumination device includes a light source, a first liquid crystal cell over the light source, and a second liquid crystal cell over the first liquid crystal cell. Each of the first liquid crystal cell and the second liquid crystal cell includes a first substrate, a plurality of first lower electrodes, a plurality of second lower electrodes, a first liquid crystal layer, and a second substrate. The first substrate has a first region and a second region. The plurality of first lower electrodes is located over the first region and extends in a column direction. The plurality of second lower electrodes is located over the second region and extends in the column direction. The first liquid crystal layer is located over the plurality of first lower electrodes and the plurality of second lower electrodes. The second substrate is located over the first liquid crystal layer. The plurality of first lower electrodes and the plurality of second lower electrodes are configured to be driven independently from each other.

An embodiment of the present application is an optical element. The optical element includes a first substrate, a plurality of first lower electrodes, a plurality of second lower electrodes, a liquid crystal layer, a second substrate, a plurality of first upper electrodes, and a plurality of second upper electrodes. The first substrate has a first region and a second region. The plurality of first lower electrodes is located over the first region and extends in a column direction. The plurality of second lower electrodes is located over the second region and extends in the column direction. The liquid crystal layer is located over the plurality of first lower electrodes and the plurality of second lower electrodes. The second substrate opposes the first substrate through the liquid crystal layer and has a third region and a fourth region respectively overlapping the first region and the second region. The plurality of first upper electrodes is located under the third region and extends in a row direction. The plurality of second upper electrodes is located under the fourth region and extends in the row direction. The plurality of first lower electrodes, the plurality of second lower electrodes, the plurality of first upper electrodes, and the plurality of second upper electrodes are configured to be driven independently from each other.

BRIEF DESCRIPTION OF DRAWINGS

FIG. 6A is a schematic cross-sectional view of a liquid crystal cell of an illumination device according to an embodiment of the present invention.

FIG. 6B is a schematic cross-sectional view of a liquid crystal cell of an illumination device according to an embodiment of the present invention.

FIG. 14 is a schematic view for explaining an operation principle of a liquid crystal cell of an illumination device according to an embodiment of the present invention.

FIG. 25 is a schematic and perspective developed view of an illumination device according to an embodiment of the present invention.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate. The reference number is used when plural structures which are the same as or similar to each other are collectively represented, while a hyphen and a natural number are further used when these structures are independently represented. When a part of a structure is represented, a lowercase alphabet letter may be added after the reference number.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and claims, an expression that two structures "orthogonally intersect" includes not only a state where the two structures perpendicularly (90°) intersect but also a state where the two structures intersect at an angle of 90°±10°.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

First Embodiment

In this embodiment, an optical element according to an embodiment of the present invention, an illumination device 100 including the optical element, and a driving method thereof are explained.

1. Overall Structure of Illumination Device

Figure 1:
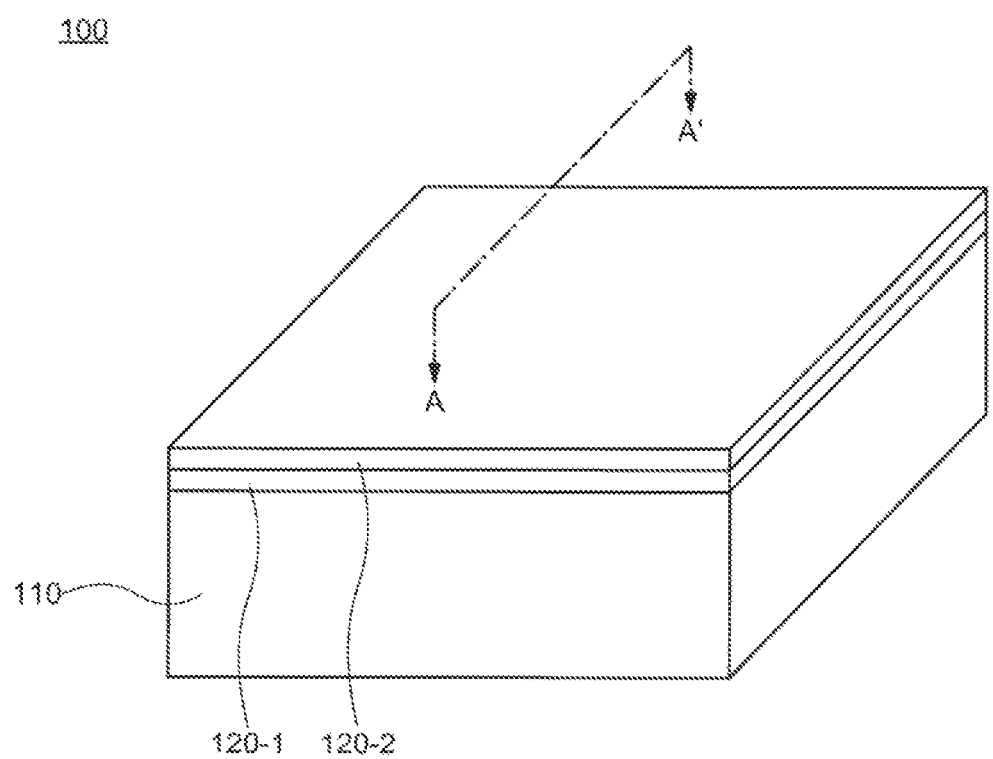
FIG. 1 is a schematic perspective view of an illumination device according to an embodiment of the present invention.

FIG. 1 shows a schematic perspective view of the illumination device 100. As shown in FIG. 1, the illumination device 100 includes a light source 110 and two optical elements located over and overlapping the light source 110 as fundamental components. One of the optical elements is a first liquid crystal cell 120-1 over the light source 110, and the other is a second liquid crystal cell 120-2 located over and overlapping the first liquid crystal cell 120-1. The first liquid crystal cell 120-1 and the second liquid crystal cell 120-2 may be in direct contact with each other or may be fixed to each other via an adhesive layer which is not illustrated.

1-1. Light Source

Figure 2:
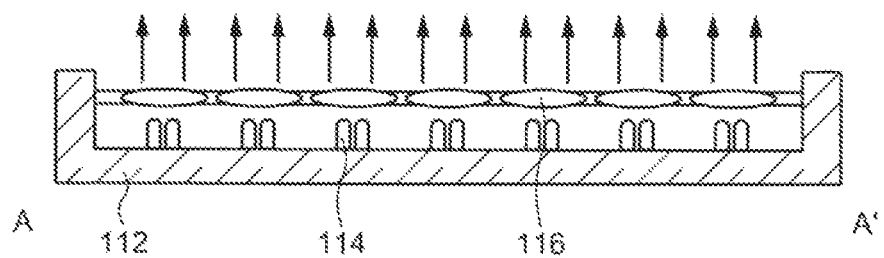
FIG. 2 is a schematic cross-sectional view of an illumination device according to an embodiment of the present invention.

The light source 110 supports the first liquid crystal cell 120-1 and the second liquid crystal cells 120-2 and also has a function to generate light in which the rays in the beam are parallel (also called collimated light) or light with reduced diffusibility (highly rectilinear light) and radiate the light upward. This light is supplied to the first liquid crystal cell 120-1 and the second liquid crystal cells 120-2. Thus, as shown in the schematic view (FIG. 2) of a cross section of the light source 110 along the chain line A-A' in FIG. 1, the light source 110 may include a housing 112, one or a plurality of light-emitting elements 114 disposed in the housing 112, and one or a plurality of lenses 116 converging the light from the light-emitting elements 114, for example.

The housing 112 includes a metal, plastic, or wood as its materials and is configured so that its interior surface is highly reflective to visible light. For example, a film containing a metal such as aluminum, silver, gold, chromium, and stainless steel or a laminate of thin films containing a high refractive-index material such as titanium oxide and tantalum oxide and thin films containing a low refractive-index material such as silicon oxide and magnesium fluoride may be arranged on the interior surface of the housing 112. The shape, thickness, and size of the housing 112 are arbitrarily determined and may be appropriately adjusted according to the performance required for the illumination device 100 (size of the illuminated area, optical characteristics of the lens 116, and the like).

The lens 116 may be arranged so as to overlap one or the plurality of light-emitting elements 114, and optical characteristics thereof may also be appropriately set according to the diffusion degree of the light from the light-emitting elements 114 and the distance from the light-emitting elements 114.

Figure 3A:
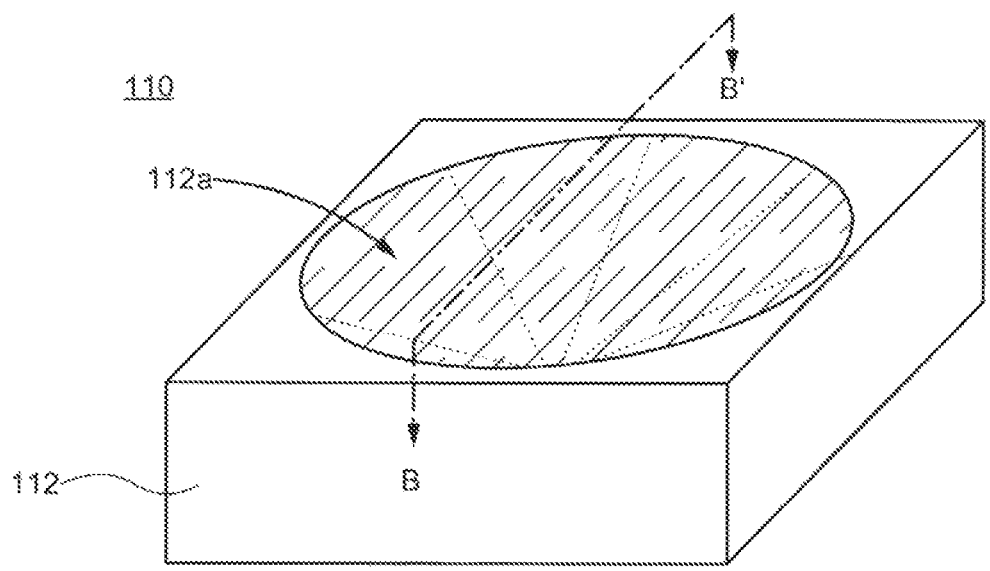
FIG. 3A is a schematic perspective view of a light source of an illumination device according to an embodiment of the present invention.
Figure 3B:
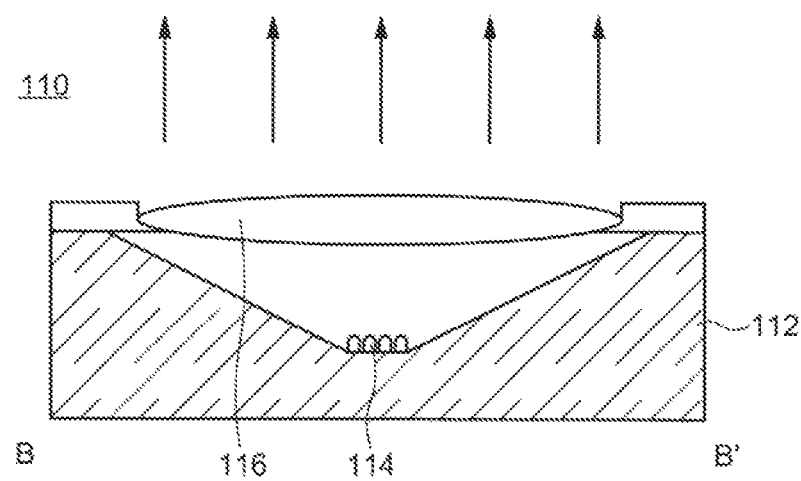
FIG. 3B is a schematic cross-sectional view of a light source of an illumination device according to an embodiment of the present invention.

Alternatively, as shown in FIG. 3A and a schematic view (FIG. 3B) of a cross section along the chain line B-B' in FIG. 3A, an inclined surface 112a may be provided in the housing 112 so that the light from one or the plurality of light-emitting elements 114 is reflected on the interior surface of the housing 112 to provide collimated light or light with reduced diffusibility. In this case, the lens 116 may also be further provided to converge the light.

The light-emitting element 114 is an element having a function to emit light when supplied with a current, and there are no restrictions on its structure. A light-emitting diode (LED) is represented as a typical example. A light-emitting diode has an electroluminescent element in which an inorganic emitter such as gallium nitride and indium-containing gallium nitride is sandwiched by a pair of electrodes and a protective film for protecting the electroluminescent element as fundamental components, for example, and is configured to emit visible light by electroluminescence.

The emission color of the light-emitting elements 114 may also be arbitrarily selected. For example, one or a plurality of light-emitting elements 114 providing white emission may be arranged in the housing 112, or the light source 110 may be configured to obtain a variety of emission colors including white by arranging a red-emissive light-emitting element 114, a green-emissive light-emitting element 114, and a blue-emissive light-emitting element 114 and mixing the light from these light-emitting elements 114.

There is no restriction on the size of each light-emitting element 114, and the light-emitting diode with an occupying area equal to or more than $1.0 \times 10^4$ μm$^2$ and equal to or less than $1.0 \times 10^6$ μm$^2$, equal to or more than $4.0 \times 10^4$ μm$^2$ and equal to or less than $5.0 \times 10^5$ μm$^2$, or equal to or more than $9.0 \times 10^4$ μm$^2$ and equal to or less than $2.5 \times 10^5$ μm$^2$ may be used, for example. As an example, a so-called micro LED of approximately 320 μm×300 μm in size may be used as the light-emitting element 114.

1-2. Liquid Crystal Cell

Figure 4:
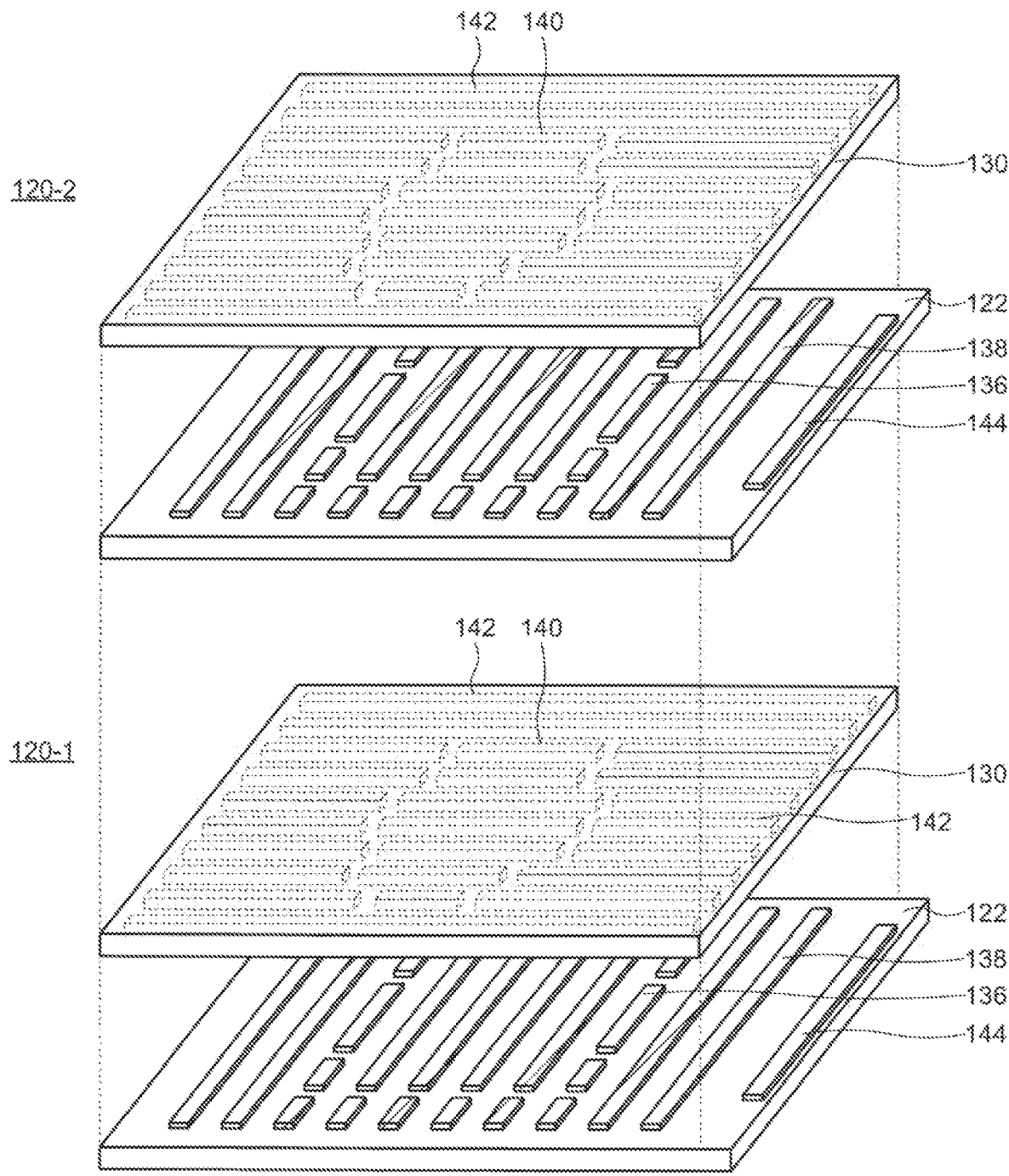
FIG. 4 is a schematic and perspective developed view of a liquid crystal cell of an illumination device according to an embodiment of the present invention.

As described above, at least two liquid crystal cells 120 are arranged over the light source 110 in the illumination device 100. A schematic developed view of the two liquid crystal cells 120 is shown in FIG. 4. The structures of the two liquid crystal cells 120 may be identical or different. As shown in FIG. 4, each of the liquid crystal cells 120 has a first substrate 122 and a second substrate 130 opposing the first substrate 122, and a variety of elements structuring a liquid crystal element (a plurality of first lower electrodes 136, a plurality of second lower electrodes 138, a plurality of first upper electrodes 140, a plurality of second upper electrodes 142, a liquid crystal layer 154, a first orientation film 150, a second orientation film 152, and the like) is arranged therebetween.

(1) First Substrate and Second Substrate

The first substrate 122 and the second substrate 130 function as a base material to provide mechanical strength to the liquid crystal cell 120 and also provide a space in which the liquid crystal layer 154 is sealed. The first substrate 122 and the second substrate 130 are preferred to include a material exhibiting high transmittance to the light from the light-emitting elements 114 in order to express the illumination function by allowing the light from the light source 110 to pass therethrough. Therefore, it is preferable to configure the first substrate 122 and the second substrate 130 to include, for example, glass, quartz, or a polymeric material such as a polyimide, a polycarbonate, a polyester, and an acrylic resin.

Figure 5:
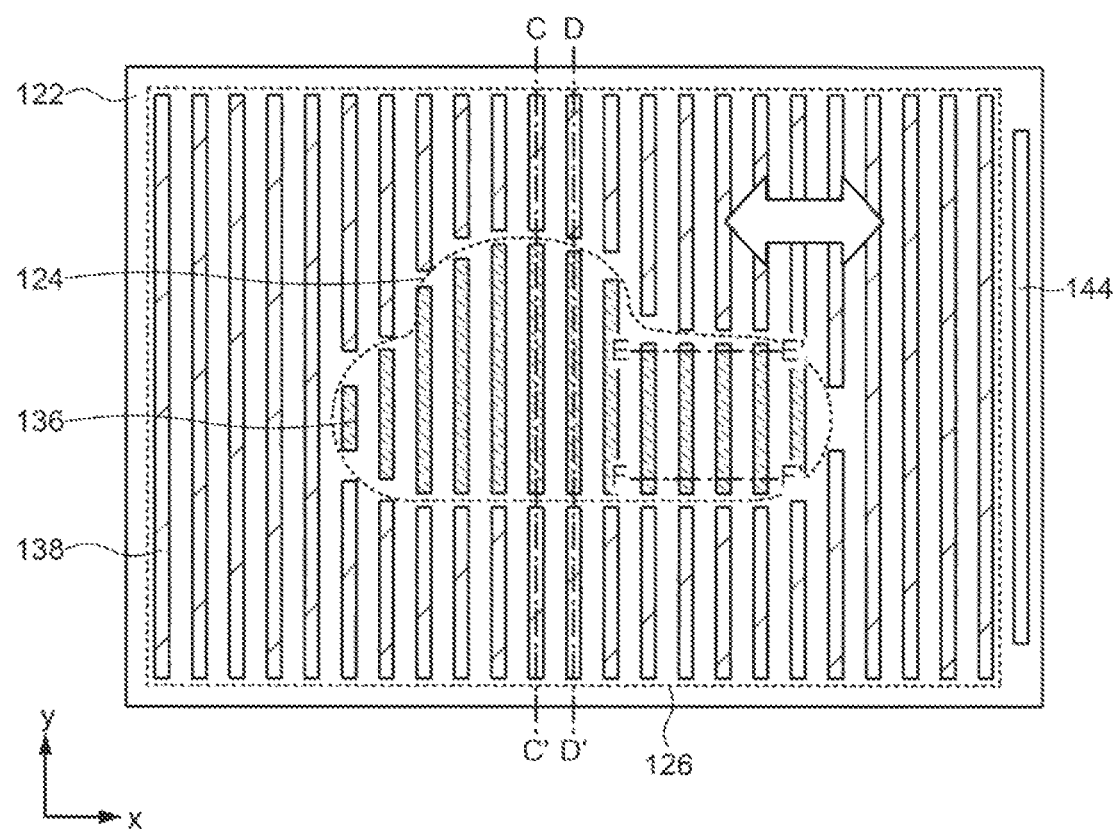
FIG. 5 is a schematic top view of a liquid crystal cell of an illumination device according to an embodiment of the present invention.
Figure 8:
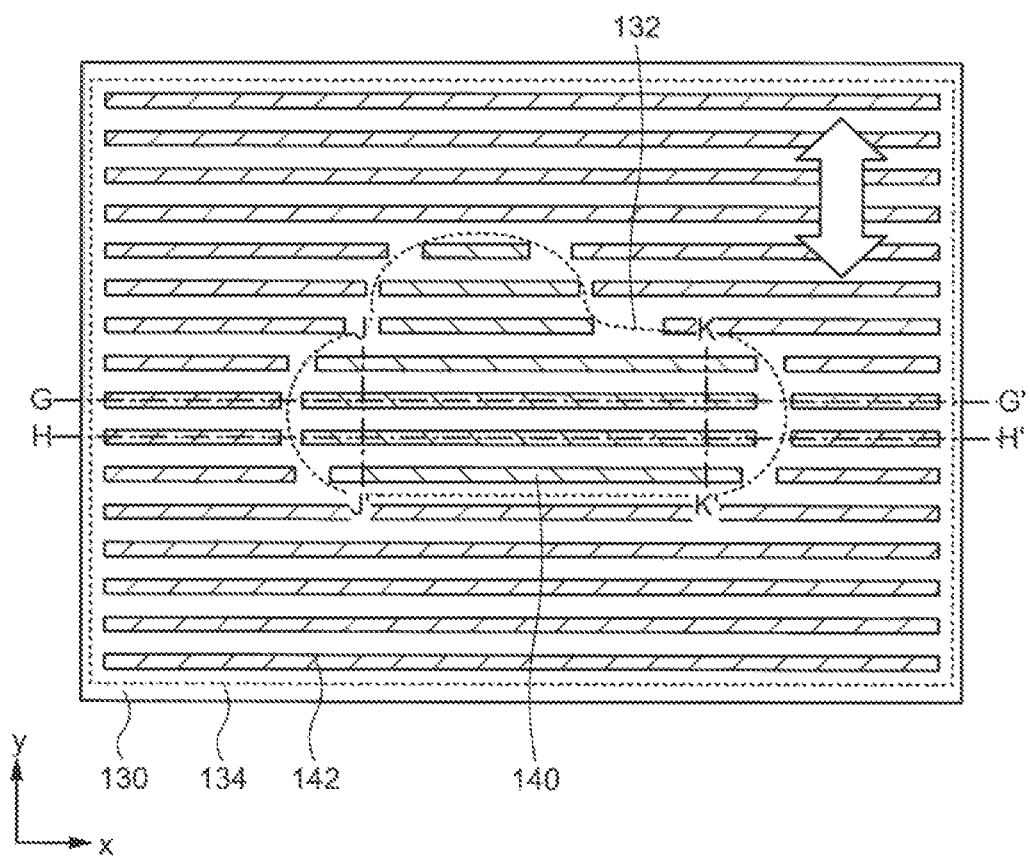
FIG. 8 is a schematic top view of a liquid crystal cell of an illumination device according to an embodiment of the present invention.

As schematically shown in FIG. 5, in each of the first liquid crystal cell 120-1 and the second liquid crystal cell 120-2, the first substrate 122 can be divided into a plurality of regions. Similarly, as shown in FIG. 8, in each of the first liquid crystal cell 120-1 and the second liquid crystal cell 120-2, the second substrate 130 can also be divided into a plurality of regions. There is no restriction on the number of regions in the first substrate 122 and the second substrate 130, and the number of regions may be, for example, equal to or more than 2 and equal to or less than 20, equal to or more than 2 and equal to or less than 10, or equal to or more than 2 and equal to or less than 5. The shape of each region may also be arbitrarily determined. In the examples shown in FIG. 5 and FIG. 8, a cloud-shaped region and a region surrounding the cloud-shaped region are formed. Preferably, the first substrate 122 and the second substrate 130 have the same number of regions, and each region has the same shape, size, and arrangement between the first substrate 122 and second substrate 130. In this case, the plurality of regions of the first substrate 122 each overlap the corresponding regions of the second substrate 130. Hereinafter, an example is used for explanation where the first substrate 122 has two regions (a first region 124 and a second region 126) and the second substrate 130 also has two regions (a third region 132 and a fourth region 134). The first region 124 and the third region 132 have the same shape as each other and entirely overlap each other. Similarly, the second region 126 and the fourth region 134 are the same in shape as each other and entirely overlap each other. The main surfaces of the first substrate 122 and the second substrate 130 are referred to as a xy plane, the x direction is referred to as a row direction, and the y direction orthogonal to the x direction is referred to as a column direction for convenience. The normal direction to the xy plane is referred to as a z direction. For example, the x direction and the y direction are parallel to the sides of the first substrate 122 or the second substrate 130.

(2) Lower Electrode and Upper Electrode

As shown in FIG. 5, each liquid crystal cell 120 has, over the first substrate 122, the plurality of first lower electrodes 136 and the plurality of second lower electrodes 138 arranged in a stripe shape with a plurality of columns. The plurality of first lower electrodes 136 is disposed in the first region 124, while the plurality of second lower electrodes 138 is disposed in the second region 126. In other words, a single region selectively surrounding all of the plurality of first lower electrodes 136 in the xy plane is the first region 124, while a single region selectively surrounding the plurality of second lower electrodes 138 is the second region 126. As shown in FIG. 5, the first region 124 may be surrounded by the second region 126. Alternatively, the second region 126 may be surrounded by the first region 124 although not illustrated. Alternatively, the first region 124 and the second region 126 may be arranged so that one of the regions does not completely surround the other region.

The plurality of first lower electrodes 136 and the plurality of second lower electrodes 138 both extend in one direction, namely in the column direction (y direction in the example shown in FIG. 5). In each column, only a single first lower electrode 136 may be disposed, or a plurality of first lower electrodes 136 may be arranged to overlap in the y direction. Similarly, in each column, only a single second lower electrode 138 may be disposed, or a plurality of second lower electrodes 138 may be arranged to overlap in they direction. When the first region 124 and the second region 126 overlap in the y direction, one or a plurality of first lower electrodes 136 may be sandwiched by two second lower electrodes 138 adjacent in the y direction.

Similarly, as shown in FIG. 8, each liquid crystal cell 120 has, over the second substrate 130, the plurality of first upper electrodes 140 and the plurality of second upper electrodes 142 arranged in a stripe shape with a plurality of rows. The plurality of first upper electrodes 140 is arranged in the third region 132, while the plurality of second upper electrodes 142 is arranged in the fourth region 134. In other words, a single region selectively surrounding all of the plurality of first upper electrodes 140 in the xy plane is the third region 132, while a single region selectively surrounding the plurality of second upper electrodes 142 is the fourth region 134. As shown in FIG. 8, the third region 132 may be surrounded by the fourth region 134. Alternatively, the fourth region 134 may be surrounded by the third region 132 although not illustrated. Alternatively, the third region 132 and the fourth region 134 may be arranged so that one of the regions does not completely surround the other region.

Note that the plurality of first lower electrodes 136 and the plurality of second lower electrodes 138 extend in a stripe shape in the column direction (y direction), while the plurality of first upper electrodes 140 and the plurality of second upper electrodes 142 extend in the row direction (x direction) in this embodiment. In addition, each electrode extends in the row direction or the column direction as a whole. However, it is also possible to employ a configuration in which the electrodes each slightly bend at one or a plurality of locations. Furthermore, the extending direction of each of the first lower electrode 136 and the second lower electrode may also have an angle of approximately 1 to 10° with respect to the y direction. The extending direction of each of the first upper electrodes 140 and the second upper electrodes 142 may also have an angle of 1 to 10° with respect to the x direction.

The plurality of first upper electrodes 140 and the plurality of second upper electrodes 142 both extend in one direction, namely the row direction (x direction in the example shown in FIG. 8). In each row, only a single first upper electrode 140 may be disposed, or a plurality of first upper electrodes 140 may be arranged to overlap in the x direction. Similarly, in each row, only a single second upper electrode 142 may be disposed, or a plurality of second upper electrodes 142 may be arranged to overlap in the x direction. When the third region 132 and the fourth region 134 overlap in the x direction, one or a plurality of first upper electrodes 140 may be sandwiched by two second upper electrodes 142 adjacent in the x direction.

Although not illustrated, both of the plurality of first lower electrodes 136 and the plurality of second lower electrodes 138 may be arranged to extend in the row direction. In this case, the plurality of first upper electrodes 140 and the plurality of second upper electrodes 142 both extend in the column direction.

As described in detail below, the light incident from the light source 110 passes through the first liquid crystal cell 120-1 and the second liquid crystal cell 120-2 and is emitted from the illumination device 100. Therefore, in order to provide the liquid crystal cells 120 with high transparency, all of the first lower electrodes 136, the second lower electrodes 138, the first upper electrodes 140, and the second upper electrodes 142 are preferred to be formed with a conductive oxide exhibiting high transmittance with respect to visible light, such as indium-tin oxide (ITO) and indium-zinc oxide (IZO).

The first lower electrodes 136, the second lower electrodes 138, the first upper electrodes 140, and the second upper electrodes 142 are each provided with a constant or pulsed alternating voltage. In the case of an alternating voltage, the plurality of first lower electrodes 136 is provided with an alternating voltage so that the phase is inverted between the first lower electrodes 136 adjacent in the row direction. The same is applied to the other electrodes. That is, the plurality of second lower electrodes 138 is provided with an alternating voltage so that the phase is inverted between the second lower electrodes 138 adjacent in the row direction, the plurality of first upper electrodes 140 is provided with an alternating voltage so that the phase is inverted between the first upper electrodes 140 adjacent in the column direction, and the plurality of second upper electrodes 142 is provided with an alternating voltage so that the phase is inverted between the second upper electrodes 142 adjacent in the column direction. Note that the plurality of first lower electrodes 136 overlapping in the column direction is provided with the same in-phase alternating voltage as each other, and the plurality of second lower electrodes 138 overlapping in the column direction is also provided with the same in-phase alternating voltage as each other. Similarly, the plurality of first upper electrodes 140 overlapping in the row direction is provided with the same in-phase alternating voltage as each other, and the plurality of second upper electrodes 142 overlapping in the row direction is also provided with the same in-phase alternating voltage as each other.

In each of the liquid crystal cells 120, the first lower electrodes 136, the second lower electrodes 138, the first upper electrodes 140, and the second upper electrodes 142 may be driven region by region (area drive). Specifically, the first lower electrodes 136 and the second lower electrodes 138 may be driven independently from each other. Hence, for example, the same or different alternating voltages may be simultaneously applied to the plurality of first electrodes 136 and the plurality of second lower electrodes 138, or one of the plurality of first lower electrodes 136 and the plurality of second electrodes 138 may be set in a non-driving state (i.e., no voltage or a constant voltage is applied) while providing an alternating voltage to the other. Similarly, the first upper electrodes 140 and the second upper electrodes 142 may be driven independently from each other. Hence, for example, the same or different alternating voltages may be simultaneously provided to the plurality of first upper electrodes 140 and the plurality of second upper electrodes 142, or one of the plurality of first upper electrodes 140 and the plurality of second upper electrodes 142 may be set in a non-driving state (i.e., no voltage or a constant voltage is provided), while providing an alternating voltage to the other.

An example of a wiring structure to realize the aforementioned area drive is explained using FIG. 6A to FIG. 10B. FIG. 6A to FIG. 7B are schematic views of the cross sections along the chain lines C-C', D-D', E-E', and F-F' in FIG. 5, respectively. FIG. 9A to FIG. 10B are schematic views of the cross sections along the chain lines G-G', H-H', J-J', and K-K' of FIG. 8, respectively.

As can be understood from FIG. 6A and FIG. 6B, signal lines (a first signal line 164, a second signal line 166, a third signal line 168, and a fourth signals line 170) are arranged along the sides of the first substrate 122 to provide a constant voltage or an alternating voltage to the first lower electrodes 136 and the second lower electrodes 138. These signal lines are formed of a metal such as aluminum, copper, tantalum, tungsten, titanium, and molybdenum or an alloy including at least one of these metals and are provided over the first substrate 122 so as to be in contact with the first substrate 122 or through a base film 146. The base film 146 may be formed by one or more films containing a silicon-containing inorganic compound such as silicon nitride and silicon oxide. An interlayer insulating film 148 is formed over these signal lines. The interlayer insulating film 148 may also be formed of one or more films containing a silicon-containing inorganic compound or may be formed using a polymeric compound such as an epoxy resin, an acrylic resin, a polyimide, a polyamide, and a silicon resin.

Among the plurality of first lower electrodes 136, the first lower electrodes 136 alternately selected in the row direction are electrically connected to the third signal line 168 through openings formed in the interlayer insulating film 148 (FIG. 6A). These first lower electrodes 136 may be directly connected to the third signal line 168 or may be connected to the third signal line 168 via a wiring 172 existing in a different layer from the third signal line 168 as shown in FIG. 6A. The third signal line 168 and the wiring 172 may overlap the second lower electrodes 138. Meanwhile, the remaining first lower electrodes 136 are electrically connected to the fourth signal line 170 through openings formed in the interlayer insulating film 148 (FIG. 6B). These first lower electrodes 136 may be directly connected to the fourth signal line 170 or may be connected to the fourth signal line 170 via wirings 174 existing in a different layer from the fourth signal line 170 as shown in FIG. 6B. The third signal line 168 and the fourth signal line 170 are supplied with a constant voltage or a pulsed alternating voltage inverted in phase with each other. Therefore, when an alternating voltage is supplied to the third signal line 168 and the fourth signal line 170, the alternating voltage provided to the first lower electrode 136 adjacent in the row direction is inverted in phase with each other.

Among the plurality of second lower electrodes 138, the second lower electrodes 138 alternately selected in the row direction are electrically connected to the first signal line 164 through openings formed in the interlayer insulating film 148 (FIG. 6A). These second lower electrodes 138 may be directly connected to the first signal line 164 or may be connected to the first signal line 164 via a wiring and the like which is not illustrated. Meanwhile, the remaining second lower electrodes 138 are electrically connected to the second signal line 166 through openings formed in the interlayer insulating film 148 (FIG. 6B). These second lower electrodes 138 may also be directly connected to the second signal line 166 or may be connected to the second signal line 166 via a wiring which is not illustrated. The first signal line 164 and the second signal line 166 are supplied with a constant voltage or a pulsed alternating voltage inverted in phase with each other. Therefore, when an alternating voltage is supplied to the first signal line 164 and the second signal line 166, the alternating voltage provided to the second lower electrodes 138 adjacent in the row direction is inverted in phase with each other.

Figure 7A:
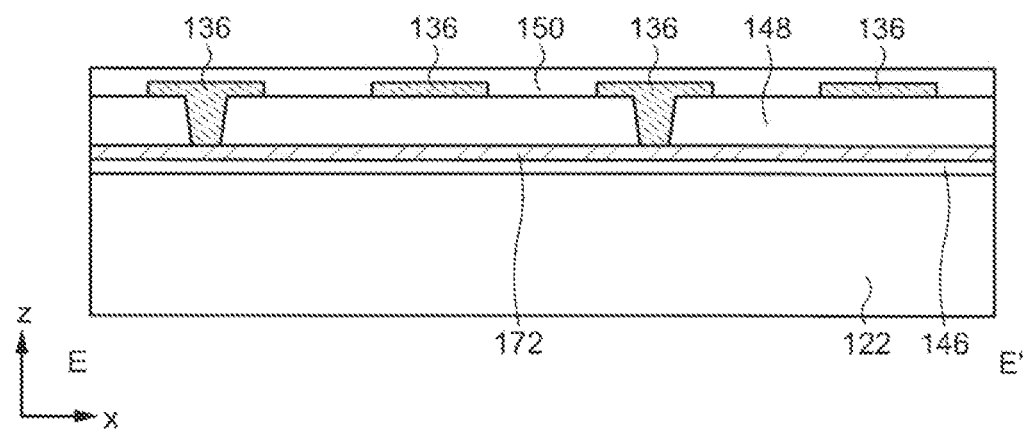
FIG. 7A is a schematic cross-sectional view of a liquid crystal cell of an illumination device according to an embodiment of the present invention.
Figure 7B:
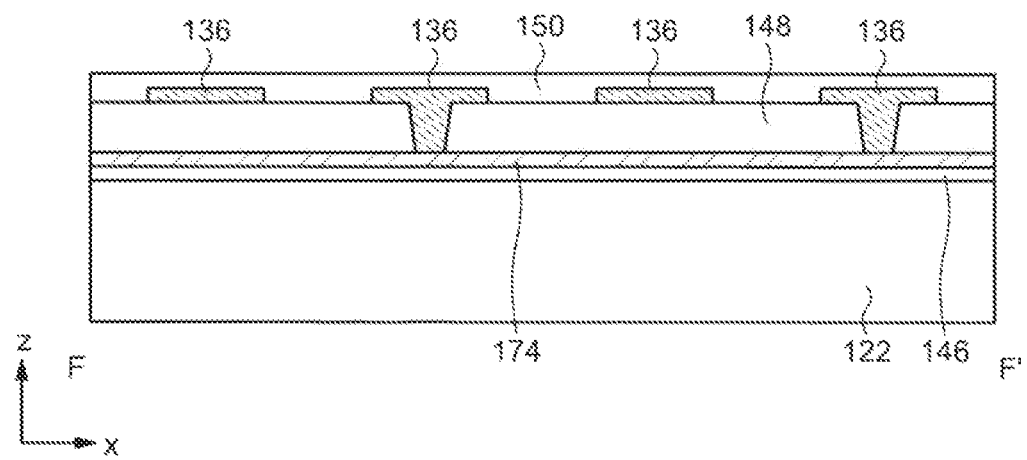
FIG. 7B is a schematic cross-sectional view of a liquid crystal cell of an illumination device according to an embodiment of the present invention.

As shown in FIG. 7A and FIG. 7B, the wiring 172 and the wiring 174 may be configured so that a portion thereof extends in the x direction. By adopting this configuration, the first lower electrodes 136 alternately selected in the row direction can be connected to the third signal line 168 via the wiring 172, and the remaining first lower electrodes 136 can be connected to the fourth signal line 170 via the wiring 174.

A similar wiring arrangement can be employed for the second substrate 130. Specifically, as can be understood from FIG. 9A and FIG. 9B, signal lines (a fifth signal line 180, a sixth signal line 182, a seventh signal line 184, an eighth signal line 186) are provided to the second substrate 130 along the sides of the second substrate 130 to supply a constant voltage or an alternating voltage to the first upper electrodes 140 and the second upper electrodes 142. These signal lines are also formed over the second substrate 130 using the materials usable in the first signal line 164 to the fourth signal line 170 (under the second substrate 130 in FIG. 9A to FIG. 10B) so as to be in contact with the second substrate 130 or through a base film 176. The base film 176 may also be formed using one or more films containing a silicon-containing inorganic compound. An interlayer insulating film 178 is formed over these signal lines. The interlayer insulating film 178 may also be formed using the materials which can be used in the interlayer insulating film 148.

Figure 9A:
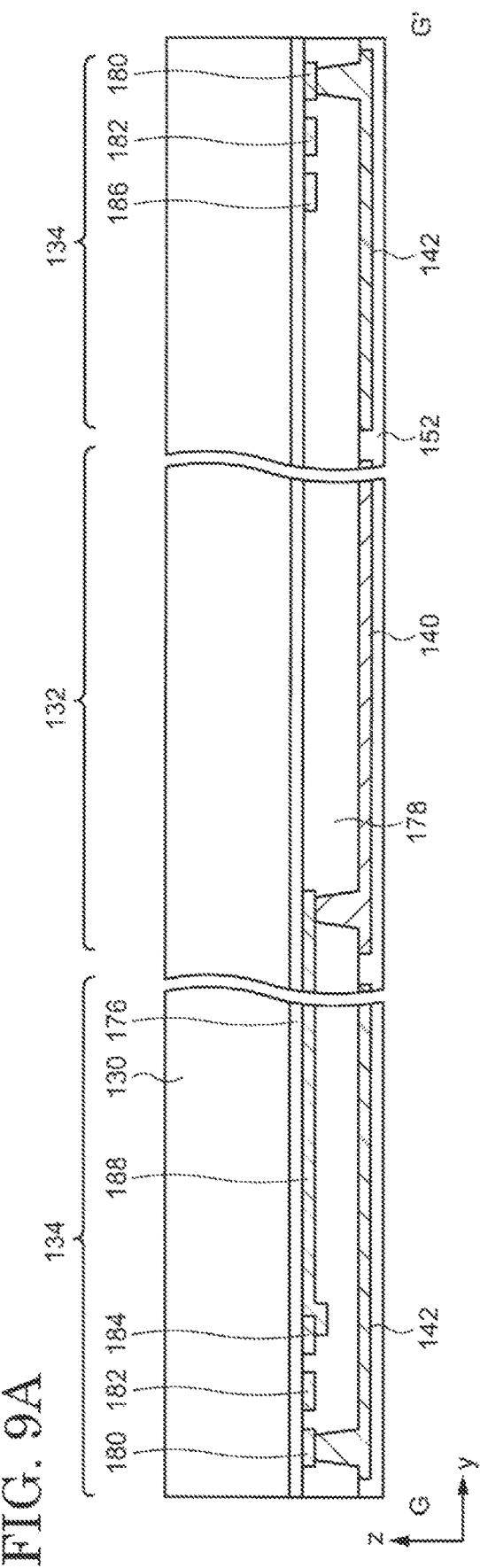
FIG. 9A is a schematic cross-sectional view of a liquid crystal cell of an illumination device according to an embodiment of the present invention.
Figure 9B:
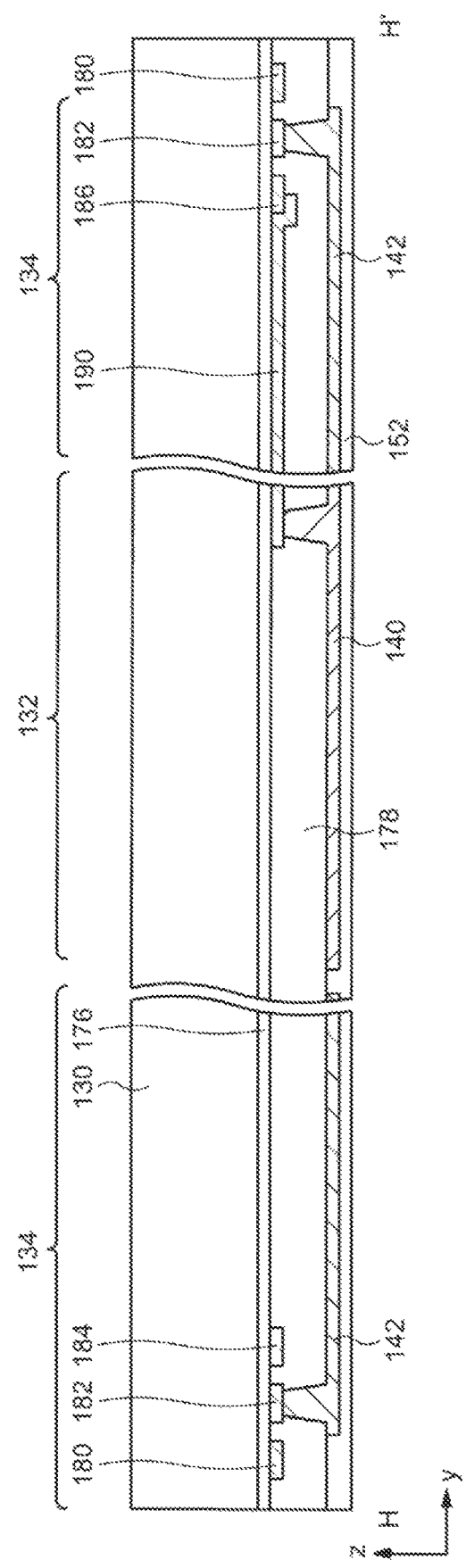
FIG. 9B is a schematic cross-sectional view of a liquid crystal cell of an illumination device according to an embodiment of the present invention.

Among the plurality of first upper electrodes 140, the first upper electrodes 140 alternately selected in the column direction are electrically connected to the seventh signal line 184 through openings formed in the interlayer insulating film 148 (FIG. 9A). These first upper electrodes 140 may be directly connected to the seventh signal line 184 or may be connected to the seventh signal line 184 via a wiring 188 existing in a different layer from the seventh signal line 184 as shown in FIG. 9A. The seventh signal line 184 and the wiring 188 may overlap the second upper electrodes 142. Meanwhile, the remaining first upper electrodes 140 are electrically connected to the eighth signal line 186 through openings formed in the interlayer insulating film 178 (FIG. 9B). These first upper electrodes 140 may be directly connected to the eighth signal line 186 or may be connected to the eighth signal line 186 via a wiring 190 existing in a different layer from the eighth signal line 186 as shown in FIG. 9B. The seventh signal line 184 and the eighth signal line 186 are supplied with a constant voltage or a pulsed alternating voltage inverted in phase with each other. Therefore, when an alternating voltage is supplied to the seventh signal line 184 and the eighth signal line 186, the alternating voltage provided to the first upper electrodes 136 adjacent in the column direction is inverted in phase with each other.

Among the plurality of second upper electrodes 142, the second upper electrodes 142 alternately selected in the column direction are electrically connected to the fifth signal line 180 through openings formed in the interlayer insulating film 178 (FIG. 9A). These second upper electrodes 142 may be directly connected to the fifth signal line 180 or may be connected to the fifth signal line 180 via a wiring or the like which is not illustrated. Meanwhile, the remaining second upper electrodes 142 are electrically connected to the sixth signal line 182 through openings formed in the interlayer insulating film 178 (FIG. 9B). These second upper electrodes 142 may also be directly connected to the sixth signal line 182 or may be connected to the sixth signal line 182 via a wiring which is not illustrated. The fifth signal line 180 and the sixth signal line 182 are supplied with a constant voltage or a pulsed alternating voltage which is inverted in phase with each other. Therefore, when an alternating voltage is supplied to the fifth signal line 180 and the sixth signal line 182, the alternating voltage provided to the second upper electrodes 142 adjacent in the column direction is inverted in phase with each other.

Figure 10A:
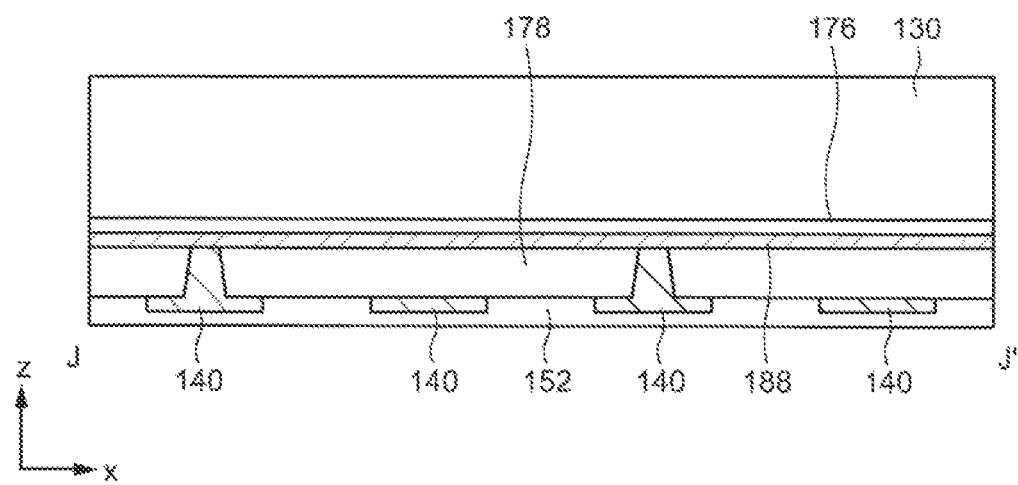
FIG. 10A is a schematic cross-sectional view of a liquid crystal cell of an illumination device according to an embodiment of the present invention.
Figure 10B:
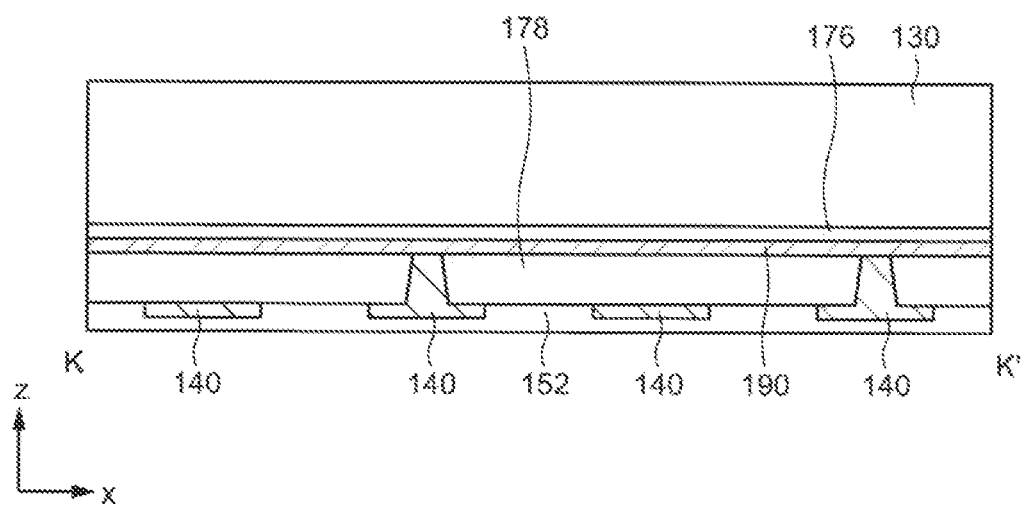
FIG. 10B is a schematic cross-sectional view of a liquid crystal cell of an illumination device according to an embodiment of the present invention.

As shown in FIG. 10A and FIG. 10B, the wiring 188 and the wiring 190 may each be configured so that a portion thereof extends in the x direction. This configuration allows the second upper electrodes 142 alternately selected in the column direction to be connected to the seventh signal line 184 via the wiring 188 and the remaining second upper electrodes 142 to be connected to the eighth signal line 186 via the wirings 190.

Although not illustrated, when the number of regions provided to the first substrate 122 and the second substrate 130 is three or more, additional signal lines are provided. Specifically, when the number of regions of the first substrate 122 and the second substrate 130 are each n (n is a natural number equal to or larger than 2), 2n signal lines may be provided to each of the first substrate 122 and the second substrate 130. Note that, in this specification, the same reference number is provided to the signal lines having the same function and that, even if one signal line provided with the same reference number is divided into a plurality of signal lines, these signal lines are assumed to be the same.

The widths of the first lower electrodes 136 and the second lower electrodes 138 (the length in the x direction intersecting the y direction which is the longitudinal direction) are selected from a range equal to or more than 2 µm and equal to or less than 10 µm or less, for example, and the distances between the first lower electrodes 136, between the second lower electrodes, and between the first lower electrode 136 and the second lower electrode 138 adjacent in the row direction may also be selected from a range equal to or more than 2 µm and equal to or less than 10 µm, for example. As a typical example, the width of each of the first lower electrodes 136 and the second lower electrodes 138 as well as their pitch in the row direction may be 5 µm and 10 µm, respectively.

The same is applied to the first upper electrodes 140 and the second upper electrode 142, and their widths (length in the y direction intersecting the x direction which is the longitudinal direction) are selected from a range equal to or more than 2 µm and equal to or less than 10 µm, for example, and the distances between the first upper electrodes 140, between the second upper electrodes 142, and between the first upper electrode 140 and the second upper electrode 142 adjacent in the column direction may also be selected from a range equal to or more than 2 µm and equal to less than 10 µm, for example. As a typical example, the width of each of the first upper electrodes 140 and the second upper electrodes 142 as well as their pitch in the column direction may be 5 µm and 10 µm, respectively.

(3) First Orientation Film, Second Orientation Film, and Liquid Crystal Layer

Figure 11:
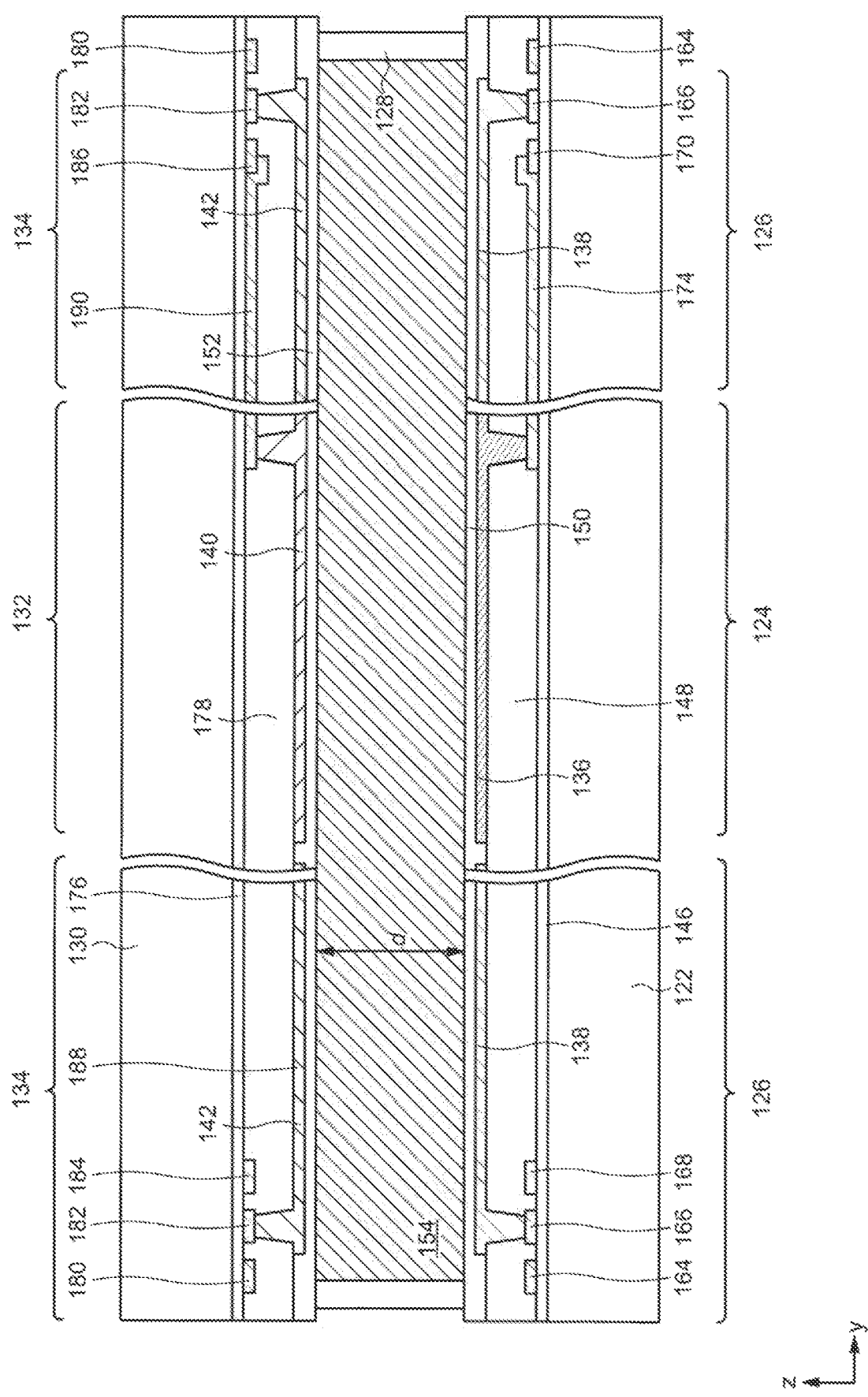
FIG. 11 is a schematic cross-sectional view of a liquid crystal cell of an illumination device according to an embodiment of the present invention.

The first orientation film 150 is provided over the plurality of first lower electrodes 136 and the plurality of second lower electrodes 138 (FIG. 6A and FIG. 6B), and the second orientation film 152 is provided over the plurality of first upper electrodes 140 and the plurality of second upper electrodes 142 (in FIG. 9A to FIG. 10B, under the plurality of first upper electrodes 140 and the plurality of second upper electrodes 142) (FIG. 9A and FIG. 9B). The first substrate 122 and the second substrate 130 are bonded and fixed with a sealing material 128 (FIG. 11). The space formed by the first substrate 122, the second substrate 130, and the sealing material 128 is filled with the liquid crystal layer 154.

The first orientation film 150 and the second orientation film 152 include a polymer such as a polyimide and a polyester, and their surfaces are subjected to a rubbing treatment. The rubbing treatment is performed so that the orientation direction of the first orientation film 150 intersects the direction in which the first lower electrodes 136 and the second lower electrodes 138 extend at a predetermined angle or perpendicularly (see the arrow in FIG. 5). In addition, the rubbing treatment is performed so that the orientation direction of the second orientation film 152 intersects the direction in which the first upper electrodes 140 and the second upper electrodes 142 extend at a predetermined angle or perpendicularly (see the arrow in FIG. 8). Therefore, the orientation direction of the first orientation film 150 and the orientation direction of the second orientation film 152 intersect at a predetermined angle or perpendicularly. Here, the orientation direction is the direction of the long axis of the liquid crystal molecules when the liquid crystal molecules are oriented in the absence of an electric field under the influence of the orientation film. Instead of the rubbing treatment, the orientation-control directions of the first orientation film 150 and the second orientation film 152 may be controlled by photo-orientation. The photo-orientation process is a rubbing-less process using light. For example, polarized light in the ultraviolet region is applied from a predetermined direction onto an orientation film which has not been subjected to the rubbing treatment. This process causes a photoreaction in the orientation film, thereby introducing anisotropy to the surface thereof to provide the ability to control liquid crystal orientation.

Liquid crystal molecules are included in the liquid crystal layer 154. The structure of the liquid crystal molecules is not limited. Thus, the liquid crystal molecules may be nematic liquid crystal, smectic liquid crystal, cholesteric liquid crystal, or chiral smectic liquid crystal.

The thickness d of the liquid crystal layer 154 (see FIG. 11), i.e., the distance between the first orientation film 150 and the second orientation film 152, is also arbitrarily determined, but is preferred to be greater than the pitches of the first lower electrodes 136, the second lower electrodes 138, the first upper electrodes 140, and the second upper electrodes 142. For example, the thickness d of the liquid crystal layer 154 is preferably set to be equal to or more than 2 times and equal to or less than 10 times, equal to or more than 2 times and equal to or less than 5 times, or equal to or more than 2 times and equal to or less than 3 times the pitches of these electrodes. A specific thickness of the liquid crystal layer 154 may be selected from a range equal to or larger than 20 µm and equal to or smaller than 60 µm or equal to or larger than 20 µm and equal to or smaller than 50 µm, for example. Although not illustrated, spacers may be provided in the liquid crystal layer 154 to maintain this thickness throughout the illumination device 100. Note that, if the aforementioned thickness of the liquid crystal layer 154 is employed in a liquid crystal display device, the high liquid crystal response required to display moving images cannot be obtained, and it is difficult to obtain the functions as a liquid crystal display device.

(4) Other Components

In each liquid crystal cell 120, a driver circuit 144 is provided over the first substrate 122 to generate a constant voltage or an alternating voltage for illumination and supply this voltage to the first signal line 164 to the eighth signal line 186 (FIG. 4). The driver circuit 144 may be formed by appropriately combining a variety of patterned conductive films, semiconductor films, and conductive films over the first substrate 122 or by mounting, over the first substrate 122, an IC chip with an integrated circuit formed over a semiconductor substrate. Alternatively, the driver circuit 144 may not be disposed over the first substrate 122, but an IC chip may be provided as the driver circuit 144 over a connector such as a flexible printed circuit board (FPC) connected to the first signal line 164 to the eighth signal line 186.

2. Operation Principle

As described above, the light emitted from the light-emitting element 114 passes through the first liquid crystal cell 120-1 and then passes through the second liquid crystal cell 120-2 to be emitted from the illumination device 100. Each liquid crystal cell 120 is provided with the plurality of first lower electrodes 136 and the plurality of second lower electrodes 138 arranged in a stripe shape, the liquid crystal layer 154, and the plurality of first upper electrodes 140 and the plurality of second upper electrodes 142 arranged in a stripe shape and intersecting the first lower electrodes 136 and the second lower electrodes 138. Thus, it is possible to allow the liquid crystal layer 154 to function as a sort of liquid crystal lens by controlling the voltages applied to these electrodes. Moreover, the electrodes arranged in the first region 124, the second region 126, the third region 132, and the fourth region 134 are controlled independently from each other. As a result, the light-illuminated area of the light extracted from the light source 110 through the two liquid crystal cells 120 can be controlled in a diverse and arbitrary manner because the light passing through the first region 124 and the third region 132 and the light passing through the second region 126 and the fourth region 134 can be separately diffused. In addition, a pattern reflecting the shape of each region can be expressed on the illuminated area. Hereinafter, an operation principle and a driving method of the illumination device 100 are explained. Here, the "illuminated area" refers to as an area of an object irradiated with light when the illumination device 100 is driven. However, the illuminated area varies depending on an angle between the traveling direction of the light and the surface on the object and the distance between the illumination device 100 and the object. Therefore, the "illuminated area" is defined as an area where a plane perpendicular to the normal plane of the main surface of the second substrate 130 of the liquid crystal cell 120 (illuminated plane) is irradiated with the light from the illumination device 100. In the following explanation, since the operation principle of the portion where the first region 124 and the third region 132 overlap and the operation principle of the portion where the second region 126 and the fourth region 134 overlap are the same, the former operation principle is described.

2-1. Non-Driving State

Figure 12A:
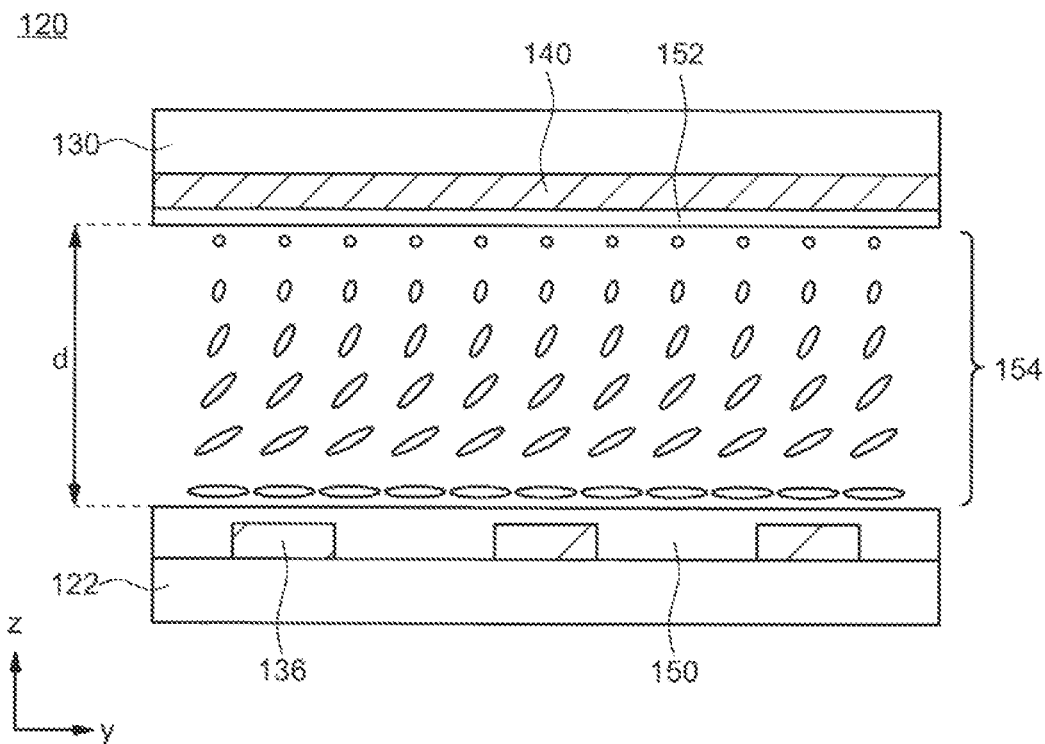
FIG. 12A is a schematic cross-sectional view for explaining an operation principle of a liquid crystal cell of an illumination device according to an embodiment of the present invention.
Figure 12B:
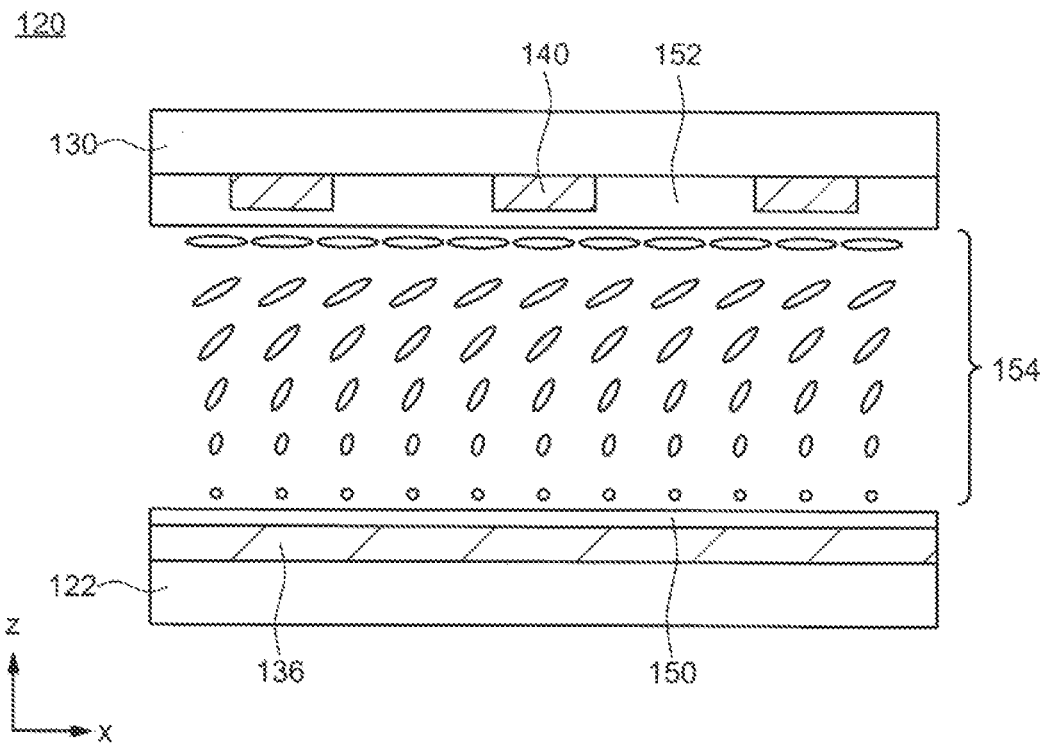
FIG. 12B is a schematic cross-sectional view for explaining an operation principle of a liquid crystal cell of an illumination device according to an embodiment of the present invention.

FIG. 12A and FIG. 12B show schematic views of a cross section of the liquid crystal cell 120 in the non-driving state. FIG. 12A is a schematic view observed from the row direction (x direction), while FIG. 12B is a schematic view observed from the column direction (y direction). In FIG. 12A and FIG. 12B, the liquid crystal molecules are schematically depicted as ellipses.

As described above, the orientation directions of the first orientation film 150 and the second orientation film 152 orthogonally intersect in the directions in which the plurality of first lower electrodes 136 and the plurality of first upper electrodes 140 extend, respectively. Therefore, when the liquid crystal cell 120 is not driven, that is, when no voltage is applied to the plurality of first lower electrodes 136 and plurality of first upper electrodes 140 or when a constant voltage is applied to each of the plurality of first lower electrodes 136 and plurality of first upper electrodes 140, the orientation of the liquid crystal molecules is not affected by the electric field and is determined by the orientation directions. As a result, on the first lower electrode 136 side, the longitudinal axes of the liquid crystal molecules are oriented along the direction (y direction) perpendicular to the direction (x direction) in which the first lower electrodes 136 extend. On the other hand, on the first upper electrode 140 side, the longitudinal axes of the liquid crystal molecules are oriented along the direction (x direction) perpendicular to the direction (y direction) in which the first upper electrodes 140 extend. Furthermore, the orientation direction of the liquid crystal molecules rotates about the z direction as a center axis as it approaches the second substrates 130 from the first substrates 122 and is eventually twisted by 90°.

2-2. Driving State

In the driving state, a pulsed alternating voltage is applied to the plurality of first lower electrodes 136 of the first liquid crystal cell 120-1 and the second liquid crystal cell 120-2 so that the phase is inverted between the first lower electrodes 136 adjacent in the row direction. Similarly, an alternating voltage is applied to the plurality of first upper electrodes 140 of the first liquid crystal cell 120-1 and the second liquid crystal cell 120-2 so that the phase is inverted between the first upper electrodes 140 adjacent in the column direction. In each of the liquid crystal cells 120, the frequency of these alternating voltages is the same. The alternating voltages may be selected from a range equal to or higher than 5 V and equal to or lower than 50 V or equal to or higher than 5 V and equal to or lower than 30 V, for example. The application of the alternating voltages generates an electric field (transverse electric field) between the first lower electrodes 136 adjacent in the row direction and between the first upper electrodes 140 adjacent in the column direction as shown by the arrows in FIG. 13A and FIG. 13B, respectively. Meanwhile, an electric field (vertical electric field) is also generated between the first lower electrodes 136 and the first upper electrodes 140. However, the thickness d of the liquid crystal layer 154 is larger than the distance between adjacent first lower electrodes 136 and between adjacent first upper electrodes 140 as described above. Therefore, the vertical electric field can be ignored with respect to the transverse electric field, and the liquid crystal molecules are oriented according to the transverse electric field.

Figure 13A:
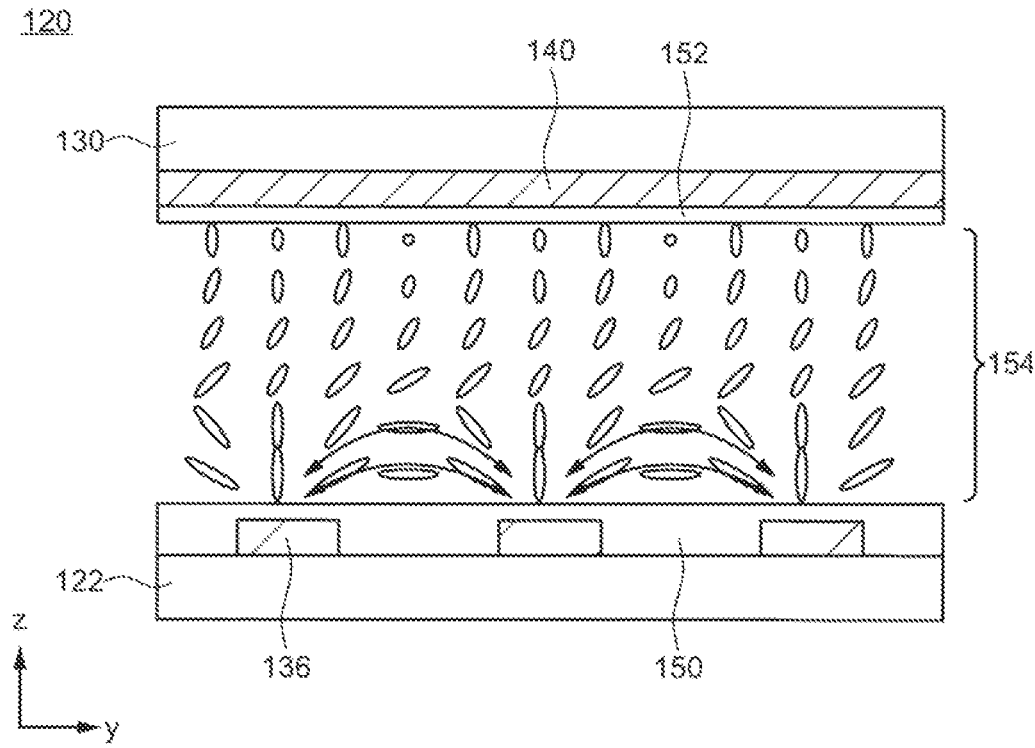
FIG. 13A is a schematic cross-sectional view for explaining an operation principle of a liquid crystal cell of an illumination device according to an embodiment of the present invention.
Figure 13B:
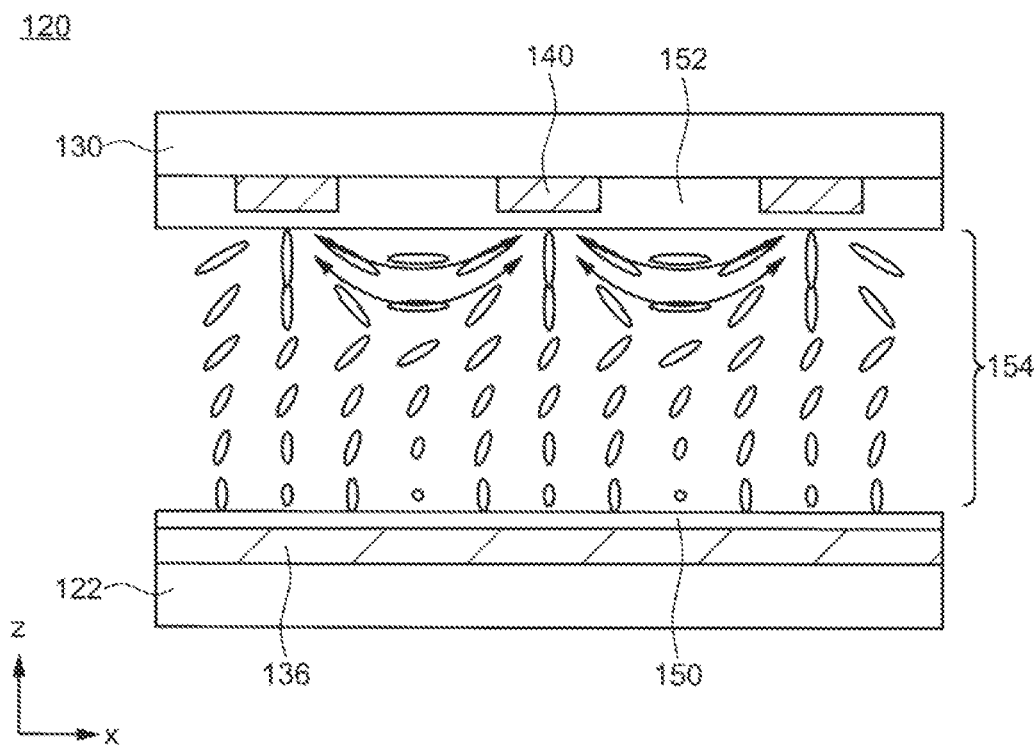
FIG. 13B is a schematic cross-sectional view for explaining an operation principle of a liquid crystal cell of an illumination device according to an embodiment of the present invention.

When the transverse electric field is generated in the liquid crystal layer 154, the liquid crystal molecules located approximately midway between the adjacent first lower electrodes 136 maintain their initial orientation state because the direction of the transverse electric field is almost parallel to the top surface of the first substrate 122 on the first substrate 122 side. However, since the direction of the electric field tilts in the z direction when it approaches the first upper electrodes 140, the liquid crystal molecules also tilt in the z direction and their angle (tilt angle) increases. As a result, the liquid crystal molecules in the liquid crystal layer 154 on the first substrate 122 side are oriented in an upwardly convexed arc (FIG. 13A). The same phenomenon occurs on the second substrate 130 side, and the liquid crystal molecules located approximately midway between the adjacent first upper electrodes 140 maintain their initial orientation state because the direction of the transverse electric field is approximately parallel to the lower surface of the second substrate 130. However, since the direction of the electric field tilts in the z-direction when it approaches the first upper electrodes 140, the liquid crystal molecules also tilt in the z-direction and their tilt angle increases. As a result, the liquid crystal molecules in the liquid crystal layer 154 on the second substrate 130 side are oriented in a downwardly convexed arc (FIG. 13B).

Due to the orientation change of the liquid crystal molecules, the light incident on the liquid crystal layer 154 diffuses according to the refractive-index distribution of the arc-oriented liquid crystal molecules on the first substrate 122 side and further diffuses according to the refractive-index distribution arc-oriented liquid crystal molecules on the second substrate 130 side. As a result, the liquid crystal cell 120 functions as a lens diffusing light. This light diffusion mechanism is explained in detail using FIG. 14. FIG. 14 shows a schematic perspective view illustrating the orientation of the liquid crystal molecules shown in FIG. 13A and FIG. 13B and a schematic view showing the behavior of the light passing through the two liquid crystal cells 120. Here, an explanation is provided using an example as a model in which the extending directions of the first lower electrodes 136 are parallel to each other, and the extending directions of the first upper electrodes 140 are also parallel to each other between the two liquid crystal cells 120.

As described above, when a pulsed alternating voltage is applied to the plurality of first lower electrodes 136 so that the phase is inverted between adjacent first lower electrodes 136 and a pulsed alternating voltage is applied to the plurality of first upper electrodes so that the phase is inverted between adjacent first upper electrodes 140, the transverse electric fields orthogonal to each other are generated on the first lower electrode 136 side and the first upper electrode 140 side as shown in FIG. 14. As a result, the liquid crystal molecules in the liquid crystal layer 154 are oriented convexly upward between adjacent first lower electrode 136 sides on the first substrate 122 side and convexly downward between adjacent first upper electrodes 140 on the second substrate 130 side. The orientation of the liquid crystal molecules is twisted by 90° when it approaches the first upper electrode 140 from the first lower electrode 136.

As shown in FIG. 14, the light emitted from the light source 110 first enters the first liquid crystal cell 120-1. This light includes a polarization component 200 in the y direction (straight arrow in the drawing) and a polarization component 206 in the x direction (circled symbol with a cross in the drawing). Hereafter, the y-directional polarization component 200 and the x-directional polarization component 206 of the light before entering the liquid crystal cell 120 are respectively called a S component and a P component for convenience, and these terms are used regardless of the rotation of the polarization axis.

Since the liquid crystal molecules are oriented along the y direction on the first lower electrode 136 side, the liquid crystal layer 154 has a refractive-index distribution in the y direction. Therefore, the S component 200 incident on the liquid crystal layer 154 diffuses in the y direction due to the refractive-index distribution in the y direction on the first lower electrode 136 side. This light undergoes optical rotation due to the twisting of the orientation of the liquid crystal molecules when passing through the liquid crystal layer 154, and the polarization axis thereof changes to the x direction. This light is further diffused in the x direction because the liquid crystal layer 154 has a refractive-index distribution in the x direction on the first upper electrode 140 side. Accordingly, the S component 200 becomes a S component 202 diffused in the x direction and the y direction when passing through the liquid crystal layer 154 of the first liquid crystal cell 120-1.

On the other hand, the refractive-index distribution exists in the y direction on the first lower electrode 136 side. Hence, the P component 206 incident on the first liquid crystal cell 120-1 is not affected by the refractive-index distribution and undergoes optical rotation without diffusion due to the twist in the orientation of the liquid crystal molecules, resulting in the change of the polarization axis to the y direction. In addition, since the refractive-index distribution on the first upper electrode 140 side exists in the x direction, the P component 206 with the polarization axis changed to the y direction is not affected by the refractive-index distribution. As a result, the P component 206 is not diffused but undergoes optical rotation to become a P component 208 when passing through the liquid crystal layer 154 of the first liquid crystal cell 120-1.

Next, the light which has passed through the first liquid crystal cell 120-1 is considered. In this model, the longitudinal directions of the first lower electrodes 136 are parallel to each other, and the longitudinal directions of the first upper electrodes 140 are also parallel to each other between the first liquid crystal cell 120-1 and the second liquid crystal cell 120-2 as described above. Therefore, a refractive-index distribution also exists in the y direction on the first lower electrode 136 side in the liquid crystal layer 154 of the second liquid crystal cell 120-2, while a refractive-index distribution exists in the x direction on the first upper electrode 140 side.

As described above, the S component 200 is diffused in the x direction and the y direction to become the S component 202 when passing through the first liquid crystal cell 120-1. This S component 202 does not diffuse because the polarization axis thereof is orthogonal to the direction of the refractive-index distribution on the first lower electrode 136 side of the second liquid crystal cell 120-2. The S component 202 undergoes optical rotation according to the twist in the orientation of the liquid crystal molecules and its polarization axis changes to the y direction when passing through the liquid crystal layer 154. However, since the refractive-index distribution on the first upper electrode 140 side is in the x direction, the S component 202 is not affected by the refractive-index distribution. As a result, the S component 202 is optically rotated by the second liquid crystal cell 120-2, but is not diffused to become a S component 204. In summary, the S component 200 emitted from the light source 110 is diffused in the x direction and they direction while being optically rotated by the first liquid crystal cell 120-1 to become the S component 202, and is then optically rotated without diffusion by the second liquid crystal cell 120-2, eventually resulting in the S component 204 diffused in the x direction and the y direction.

On the other hand, the P component 208 incident on the liquid crystal layer 154 of the second liquid crystal cell 120-2 diffuses in the y direction due to the refractive-index distribution in the y direction on the first lower electrode 136 side. The polarization axis of this light is changed to the x direction due to the optical rotation caused by the twist of the orientation of the liquid crystal molecules when passing through the liquid crystal layer 154. This light then diffuses in the x direction because the liquid crystal layer 154 has the refractive-index distribution in the x direction on the first upper electrode 140 side. As a result, the P component is diffused in the x direction and the y direction while optically rotating to become a P component 210 when passing through the second liquid crystal cell 120-2. In summary, the P component 206 emitted from the light source 110 is optically rotated without diffusion by the first liquid crystal cell 120-1 and is then diffused in the x direction and the y direction while being optically rotated by the second liquid crystal cell 120-2, eventually resulting in the P component 210 diffused in the x direction and the y direction.

Since the degree of orientation of the liquid crystal molecules can be controlled by the voltages respectively applied to the first lower electrodes 136 and the first upper electrodes 140, the degree of light diffusion can also be controlled by the voltages applied to the first lower electrodes 136 and the first upper electrodes 140. Thus, in accordance with the mechanism described above, the degree of diffusion of the light passing through the first region 124 and the third region 132 can be independently controlled by the voltages applied to the first lower electrodes 136 and the first upper electrodes 140.

Note that the diffusion of the light is controlled by the transverse electric field generated between adjacent first lower electrodes 136 and between adjacent first upper electrodes 140. Therefore, the light diffusion can be realized as long as a potential difference is provided between adjacent first lower electrodes 136 and/or between adjacent first upper electrodes 140 in each liquid crystal cell. Hence, constant and different voltages may be applied to adjacent first lower electrodes 136. Alternatively, an alternating voltage may be applied to a plurality of first lower electrodes 136a which are alternately selected, while a constant voltage may be applied to the remaining first lower electrodes 136. The same is applied to the first upper electrodes 140.

3. Light Distribution Control

By using the mechanism described above, the illuminated area of the light source 110 can be arbitrarily controlled, and a pattern reflecting the shapes of the first region 124 to the fourth region 134 can be expressed on the illuminated plane. This is explained below.

Figure 15A:
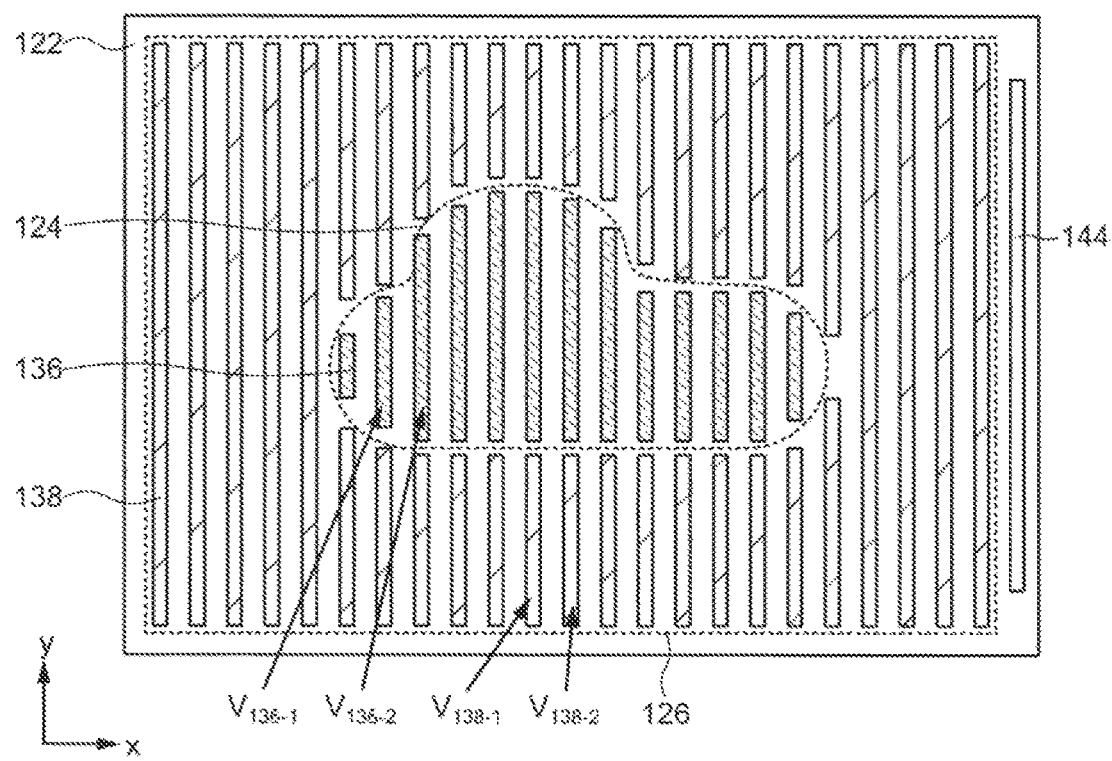
FIG. 15A is a schematic top view for explaining an operation principle of a liquid crystal cell of an illumination device according to an embodiment of the present invention.
Figure 15B:
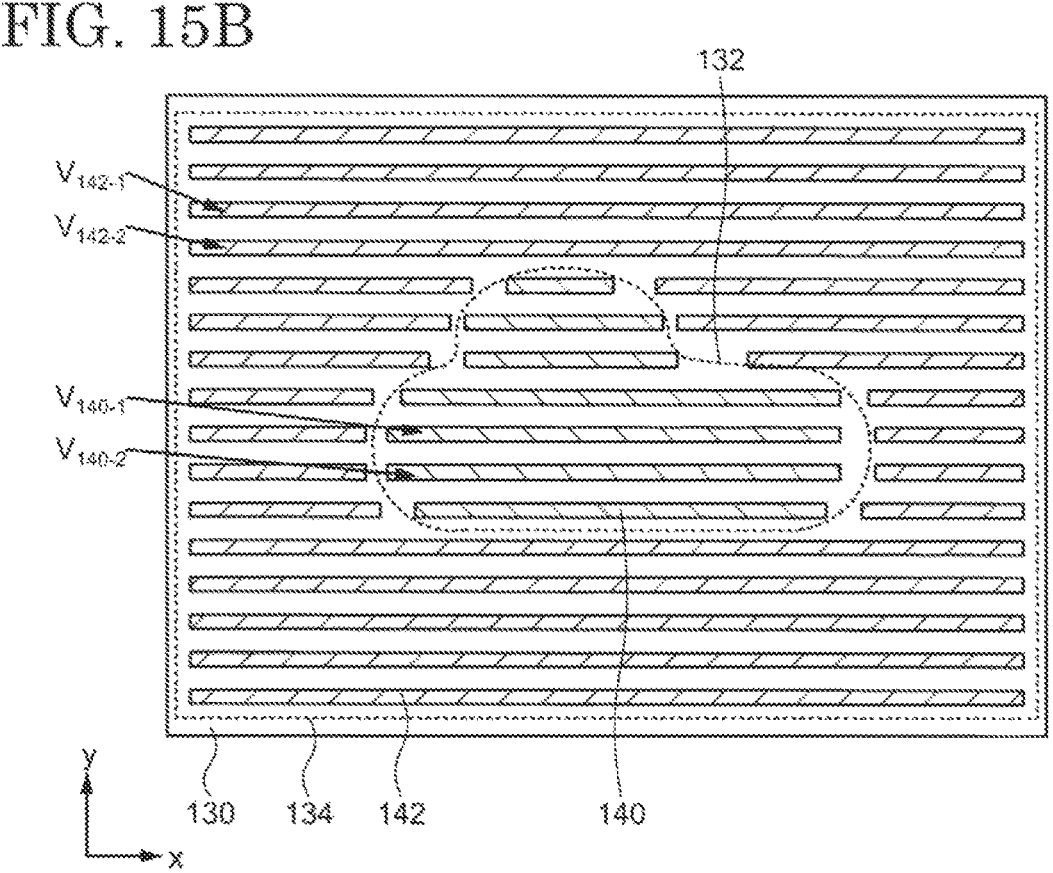
FIG. 15B is a schematic top view for explaining an operation principle of a liquid crystal cell of an illumination device according to an embodiment of the present invention.

In the following explanation, it is assumed that an alternating voltage $V_{136-1}$ is applied to the plurality of first lower electrodes 136 which is alternately selected, and that an alternating voltage $V_{136-2}$ is applied to the remaining plurality of first lower electrodes 136 in each liquid crystal cell 120 as shown in FIG. 15A. It is also assumed that an alternating voltage $V_{138-1}$ is applied to the plurality of second lower electrodes 138 which are alternately selected and that an alternating voltage $V_{138-2}$ is applied to the remaining plurality of second lower electrodes 138. Similarly, it is assumed that an alternating voltage $V_{140-1}$ is applied to the plurality of first upper electrodes 140 which are alternately selected and that an alternately voltage $V_{140-2}$ is applied to the remaining plurality of first upper electrodes 140 as shown in FIG. 15B. In addition, it is assumed that an alternating voltage $V_{142-1}$ is applied to the plurality of second upper electrodes 142 which are alternately selected, and an alternating voltage $V_{142-2}$ is applied to the remaining plurality of second upper electrodes 142. In this model, the first lower electrodes 136, the second lower electrodes 138, the first upper electrodes 140, and the second upper electrodes 142 are also respectively parallel to each other between the two liquid crystal cells 120. Since the shapes of the regions formed in each liquid crystal cell 120 are arbitrary determined as described above, an example is used in a part of the following explanation in which the first region 124 and the third region 132 have the same star shape as each other, and the second region 126 and the fourth region 134 have a shape surrounding the aforementioned star shape.

3-1. Non-Driving State of Liquid Crystal Cell

Figure 16:
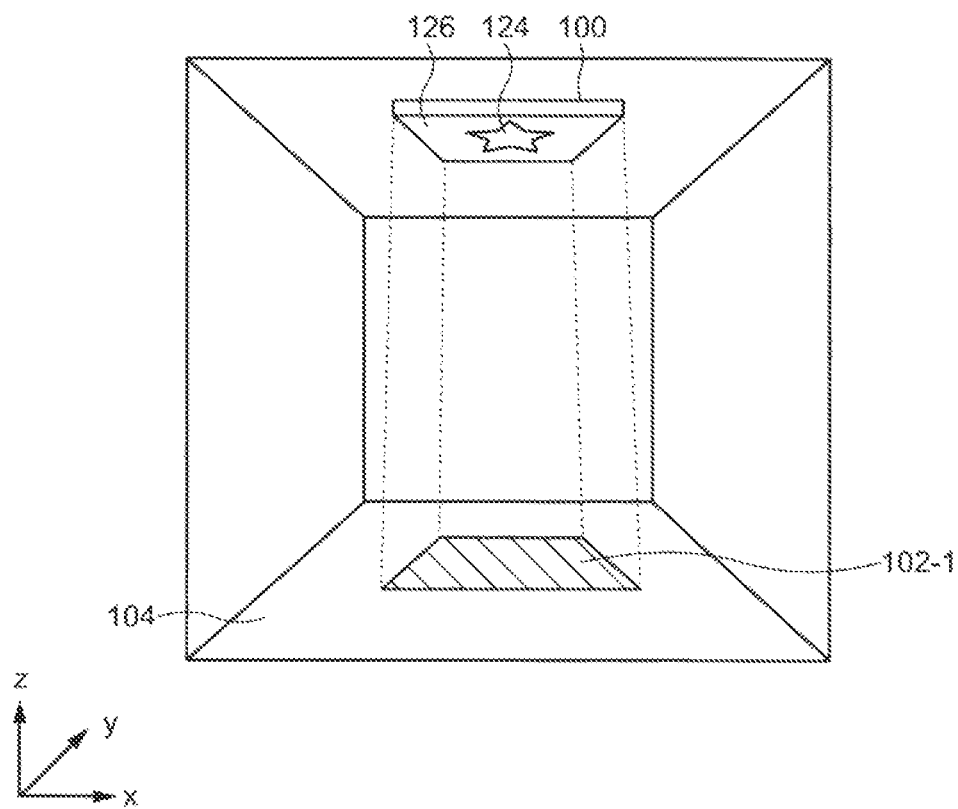
FIG. 16 is a schematic view showing an illuminated area of an illumination device according to an embodiment of the present invention.

When the liquid crystal cells 120 are not driven, no electric field is generated between adjacent electrodes. Therefore, since there is no refractive-index distribution in the liquid crystal layer 154, the S component 200 and the P component 206 are optically rotated by each liquid crystal cell 120 but do not experience the diffusion effects. Thus, as shown in FIG. 16, the light emitted from the light source 110 does not greatly spread when passing through the two liquid crystal cells 120, providing a relatively narrow illuminated area 102-1 on the illuminated plane 104 such as a floor, for example.

3-2. Non-Driving State of Liquid Crystal Cell

Figure 17A:
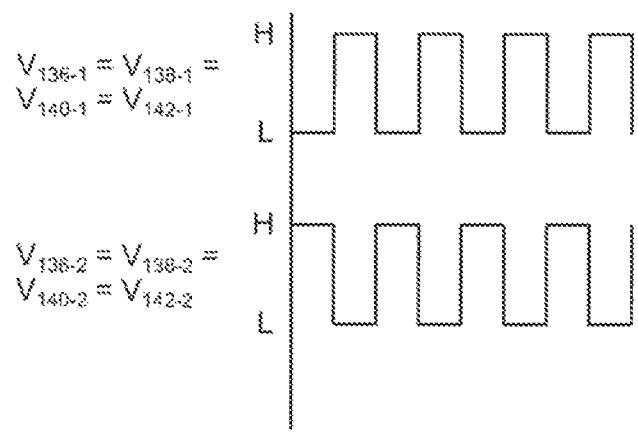
FIG. 17A is a timing chart of an illumination device according to an embodiment of the present invention.

As an example, a case is considered in which the liquid crystal cell 120 is driven according to the timing chart of FIG. 17A. Here, in each liquid crystal cell 120, an alternating voltage is provided to the plurality of first lower electrodes 136 so that the phase is inverted between adjacent first lower electrodes 136, and an alternating voltage is provided to the plurality of second lower electrodes 138 so that the phase is inverted between adjacent second lower electrodes 138. Similarly, in each liquid crystal cell 120, an alternating voltage is provided to the plurality of first upper electrodes 140 so that the phase is inverted between adjacent first upper electrodes 140, and an alternating voltage is provided to the plurality of second upper electrodes 142 so that the phase is inverted between adjacent second upper electrodes 142. The voltage applied to each electrode is the same.

Figure 17B:
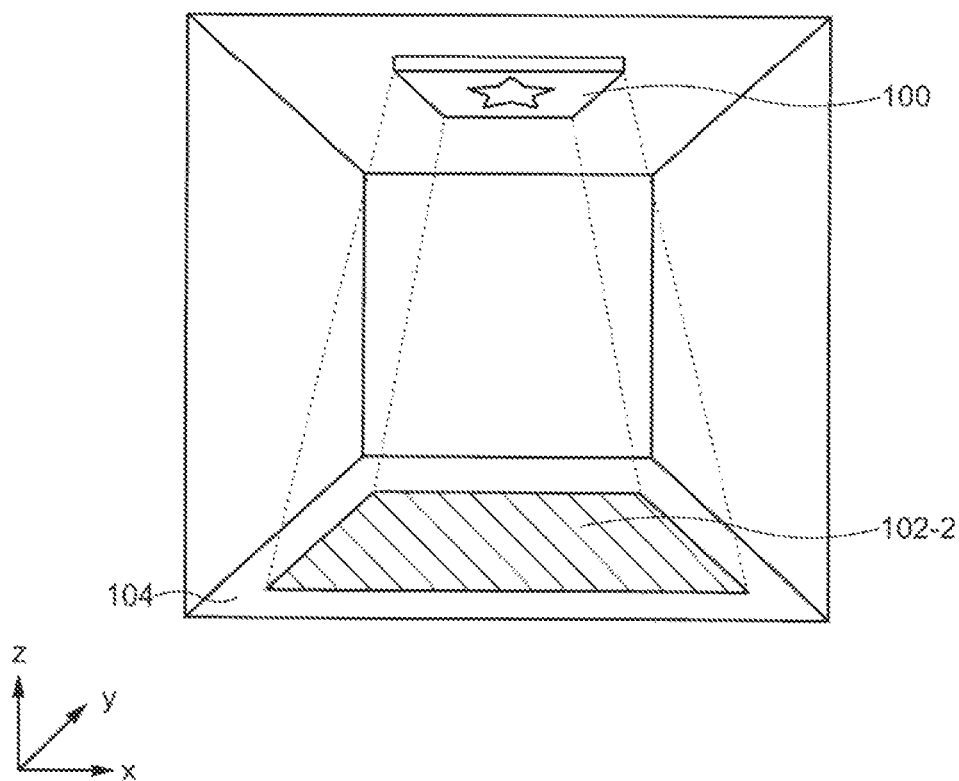
FIG. 17B is a schematic view showing an illuminated area of an illumination device according to an embodiment of the present invention.

As can be understood from FIG. 14, when the liquid crystal cells 120 are driven in this manner, the S component 200 and the P component 206 of the light from the light source 110 are diffused in the x direction and the y direction when passing through the two liquid crystal cells 120. Thus, the illumination device 100 provides an illuminated area 102-2 spread in the x direction and the y direction compared with the illuminated area 102-1 formed when the two liquid crystal cells 120 are not driven (FIG. 17B). In addition, since the voltage applied to each electrode is the same, the degrees of diffusion of the light passing through the first region 124 and the third region 132 and the light passing through the second region 126 and the fourth region 134 are substantially the same. Hence, the shape of each region is not reflected, and the illuminance distribution in the illuminated area 102-2 is small.

Figure 18A:
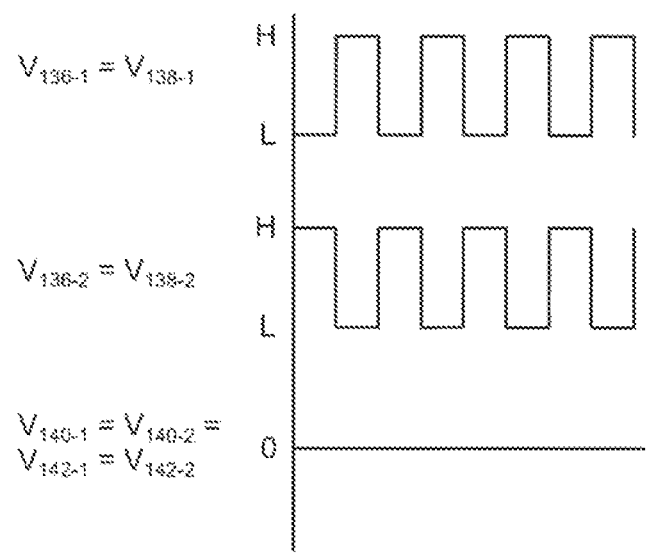
FIG. 18A is a timing chart of an illumination device according to an embodiment of the present invention.

As another example, consider the case where the liquid crystal cells 120 are driven according to the timing chart in FIG. 18A. Here, in each liquid crystal cell 120, an alternating voltage is applied to the first lower electrodes 136 so that the phase is inverted between adjacent first lower electrodes 136, and an alternating voltage is applied to the plurality of second lower electrodes 138 so that the phase is inverted between adjacent second lower electrodes 138. On the other hand, no voltage is applied or a constant voltage (e.g., a ground voltage) is applied to the plurality of first upper electrodes 140 and the plurality of second upper electrodes 142 in each liquid crystal cell 120.

Figure 18B:
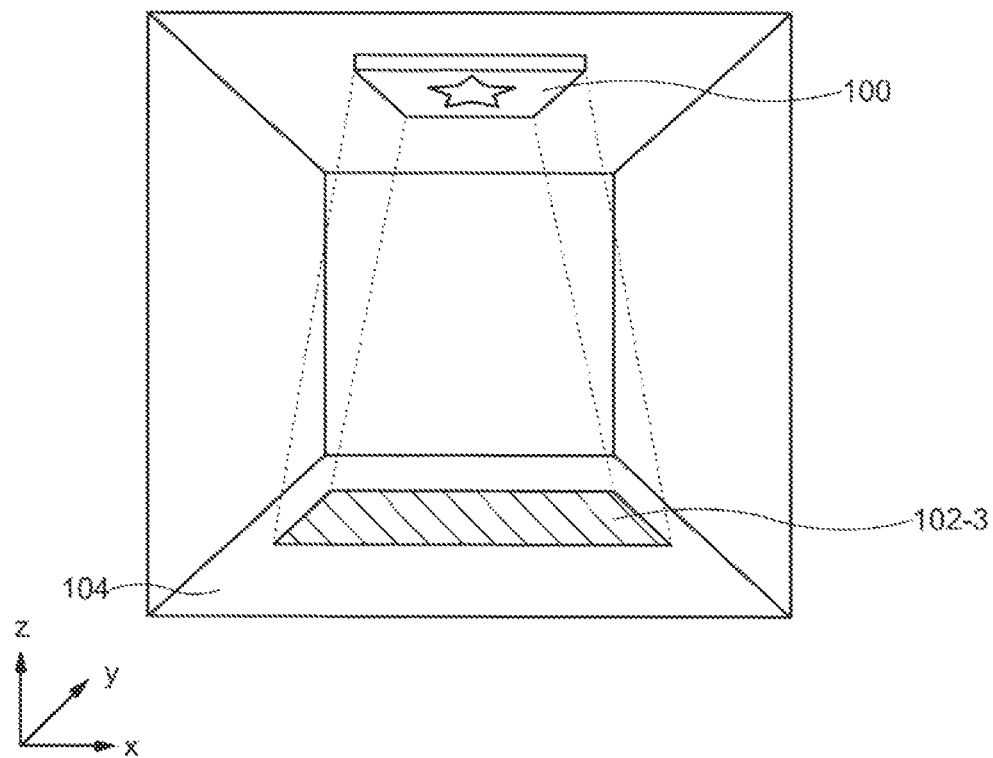
FIG. 18B is a schematic view showing an illuminated area of an illumination device according to an embodiment of the present invention.

In this case, since no transverse electric field is generated on the second substrate 130 side of the liquid crystal layer 154 in each liquid crystal cell 120, no refractive-index distribution is generated. Therefore, as can be understood from FIG. 14, both the S component 200 and the P component 206 diffuse only in the x direction. As a result, as schematically shown in FIG. 18B, an illuminated area 102-3 is provided which is spread in one direction (x direction)

compared with the illuminated area 102-1. Although a detailed explanation is omitted, no voltage or a constant voltage (e.g., a ground voltage) is applied to the plurality of first lower electrodes 136 and the plurality of second lower electrodes 138, an alternating voltage is applied to the plurality of first upper electrodes 140 so that the phase is reversed between adjacent first upper electrodes 140, and an alternating voltage is applied to the plurality of second upper electrodes 142 so that the phase is inverted between adjacent second upper electrodes 142, by which an illuminated area spread in the y direction can also be obtained In addition, the degree of the spreading can be controlled by the magnitude of the alternating voltages.

Figure 19A:
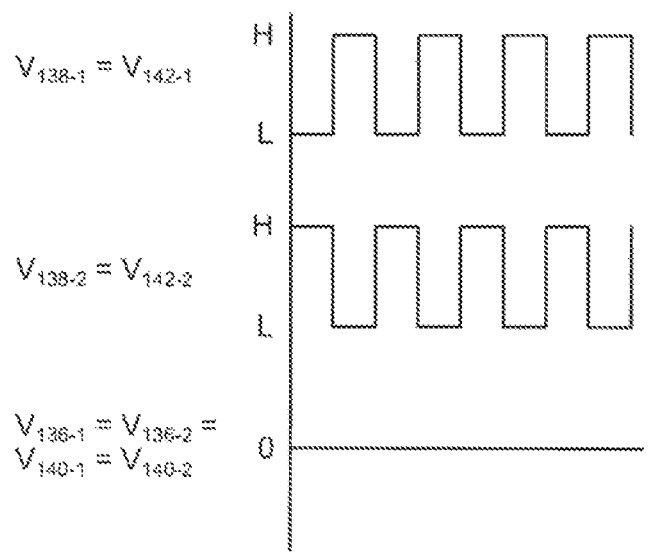
FIG. 19A is a timing chart of an illumination device according to an embodiment of the present invention.

As another example, consider the case where the liquid crystal cells 120 are driven according to the timing chart in FIG. 19A. Here, in each liquid crystal cell 120, an alternating voltage is applied to the plurality of second lower electrodes 138 so that the phase is inverted between adjacent second lower electrodes 138, and an alternating voltage is applied to the plurality of second upper electrodes 142 so that the phase is inverted between adjacent second upper electrodes 142. On the other hand, no voltage or a constant voltage is provided to the plurality of first lower electrodes 136 and the plurality of first upper electrodes 140 in each liquid crystal cell 120.

When driven in this manner, the light passing through the first region 124 and the third region 132 is not diffused. Since collimated light is emitted from the light source 110, the light passing through the first region 124 and the third region 132 does not greatly spread, forming an illuminated area 102-4 with relatively high illuminance on the illuminated plane 104.

Figure 19B:
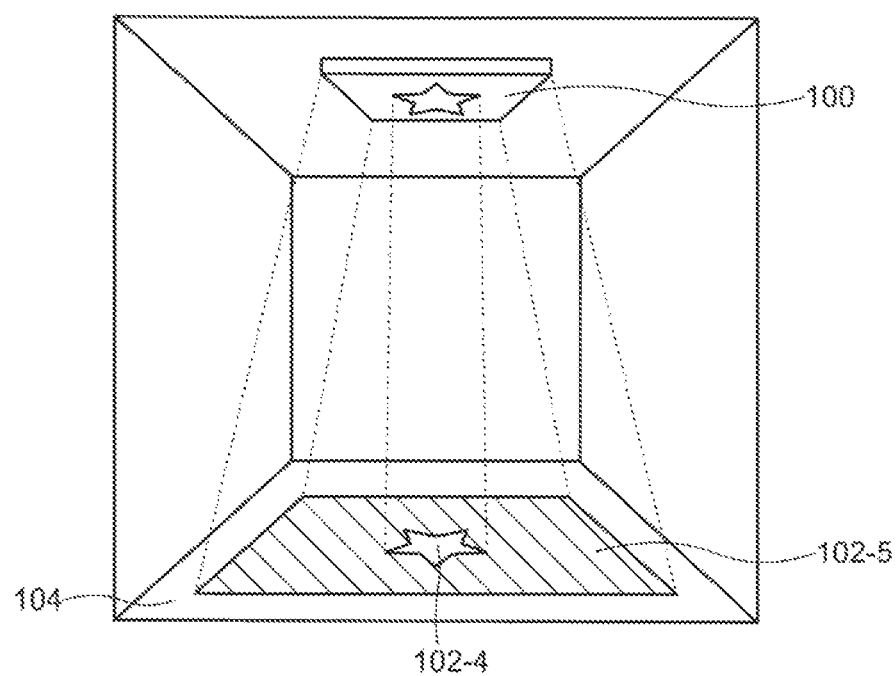
FIG. 19B is a schematic view showing an illuminated area of an illumination device according to an embodiment of the present invention.

On the other hand, the light passing through the second region 126 and fourth region 134 is diffused by the refractive-index distributions respectively formed on the first substrate 122 and second substrate 130 sides of the liquid crystal layer 154. Thus, although a wide illuminated area 102-5 is provided, the illuminance of this illuminated area 102-5 is lower than that of the illuminated area 102-4 due to the expanded illuminated area. As a result, a pattern reflecting the shapes of the first region 124 to the fourth 134 region can be expressed on the illuminated plane 104 using the difference in illuminance (FIG. 19B).

Figure 20A:
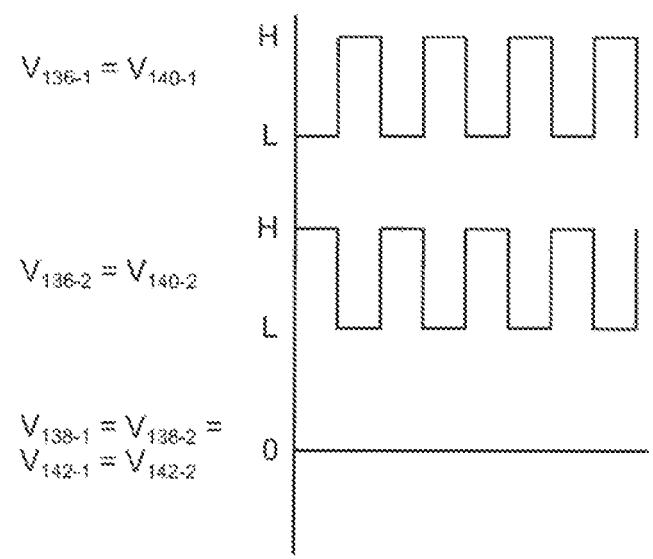
FIG. 20A is a timing chart of an illumination device according to an embodiment of the present invention.

As a reverse example, consider the case where the liquid crystal cells 120 are driven according to the timing chart in FIG. 20A. Here, in each liquid crystal cell 120, an alternating voltage is applied to the plurality of first lower electrodes 136 so that the phase is inverted between adjacent first lower electrodes 136, and an alternating voltage is applied to the plurality of first upper electrodes 140 so that the phase is inverted between adjacent first upper electrodes 140. On the other hand, no voltage or a constant voltage is provided to the plurality of second lower electrodes 138 and the plurality of second upper electrodes 142 in each liquid crystal cell 120.

When driven in such a manner, the light passing through the second region 126 and the fourth region 134 is not diffused. That is, the light emitted from the second region 126 and the fourth region 134 does not greatly spread, forming an illuminated area 102-6 with a relatively high illuminance on the illuminated plane 104.

Figure 20B:
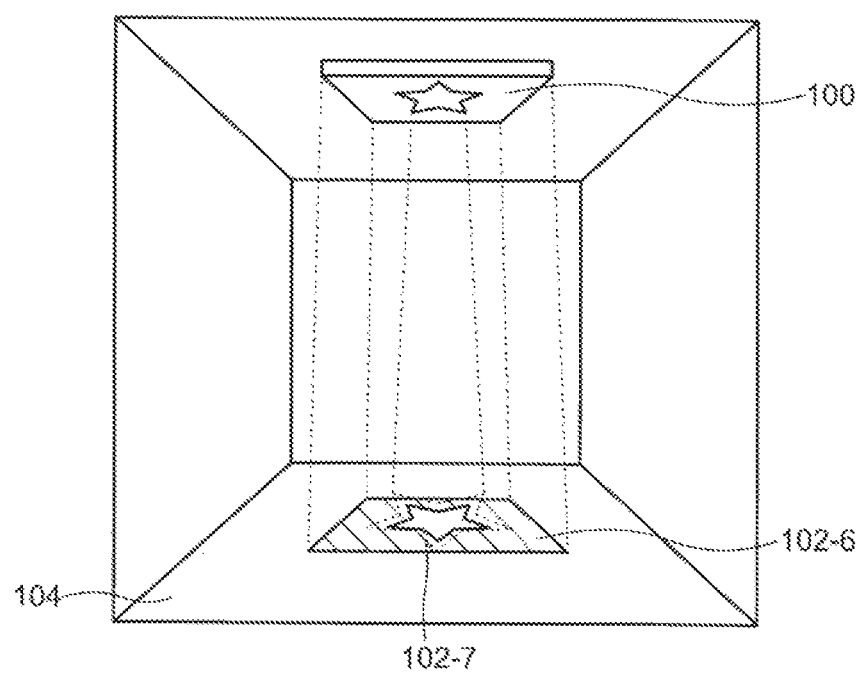
FIG. 20B is a schematic view showing an illuminated area of an illumination device according to an embodiment of the present invention.

On the other hand, the light passing through the first region 124 and the third region 132 is diffused by the refractive-index distributions respectively formed on the first substrate 122 and the second substrate 130 sides of the liquid crystal layer 154. Thus, although an illuminated area 102-7 spread more widely than the illuminated area 102-4 is provided, the illuminance of this illuminated area 102-7 is lower than that of the illuminated area 102-6. As a result, a pattern reflecting the shapes of the first region 124 to the fourth 134 region can be expressed on the illuminated plane 104 using the difference in illuminance (FIG. 20B).

Figure 21:
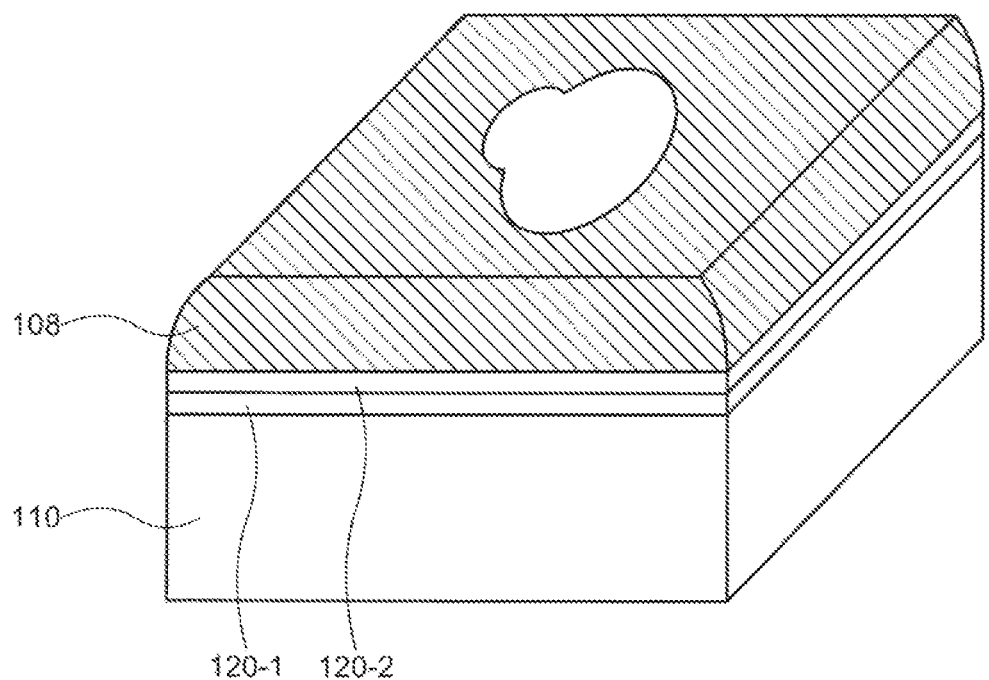
FIG. 21 is a schematic perspective view of an illumination device according to an embodiment of the present invention.

As shown in FIG. 21, when a cover 108 having a light-transmitting property and diffusing light is disposed over the liquid crystal cell 120 of the illumination device 100, a pattern reflecting the shapes of the first region 124 to the fourth 134 region can be expressed on the cover 108 because the cover 108 also serves as the illuminated plane 104. Therefore, it is also possible to see the light source 110 in which a variety of patterns is expressed.

As described above, it is possible to not only arbitrarily distribute the light from the light source 110 to create illuminated areas with a variety of shapes, but also express patterns reflecting the shape of each area on the illuminated plane by implementing the embodiments of the present invention. The illumination device 100 does not require a polarizing plate used in liquid crystal projectors and liquid crystal display devices. In addition, it is not necessary to physically shield the light from the light source 110 when the light patterns are expressed. Therefore, the light from the light source 110 can be effectively utilized. As a result, it is possible to express light patterns without increasing power consumption.

Second Embodiment

In this embodiment, modified examples of the illumination device 100 described in the First Embodiment are explained. An explanation of the structures the same as or similar to those described in the First Embodiment may be omitted.

1. Modified Example 1

Figure 22A:
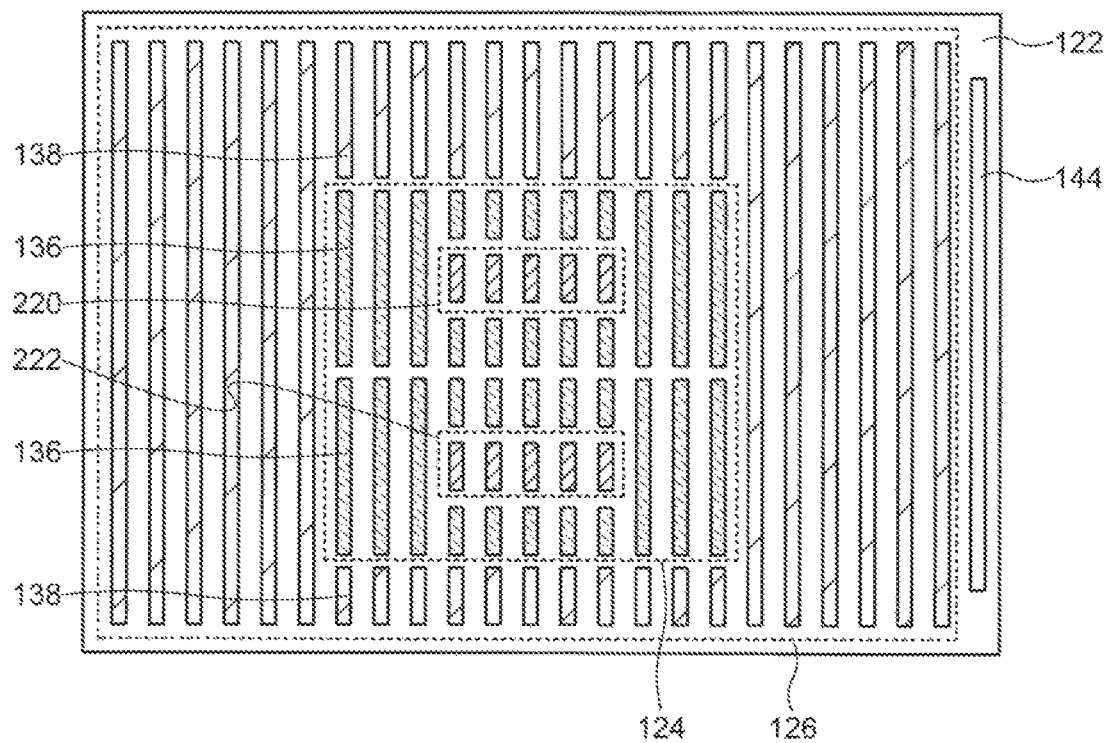
FIG. 22A is a schematic top view of a light source of an illumination device according to an embodiment of the present invention.
Figure 22B:
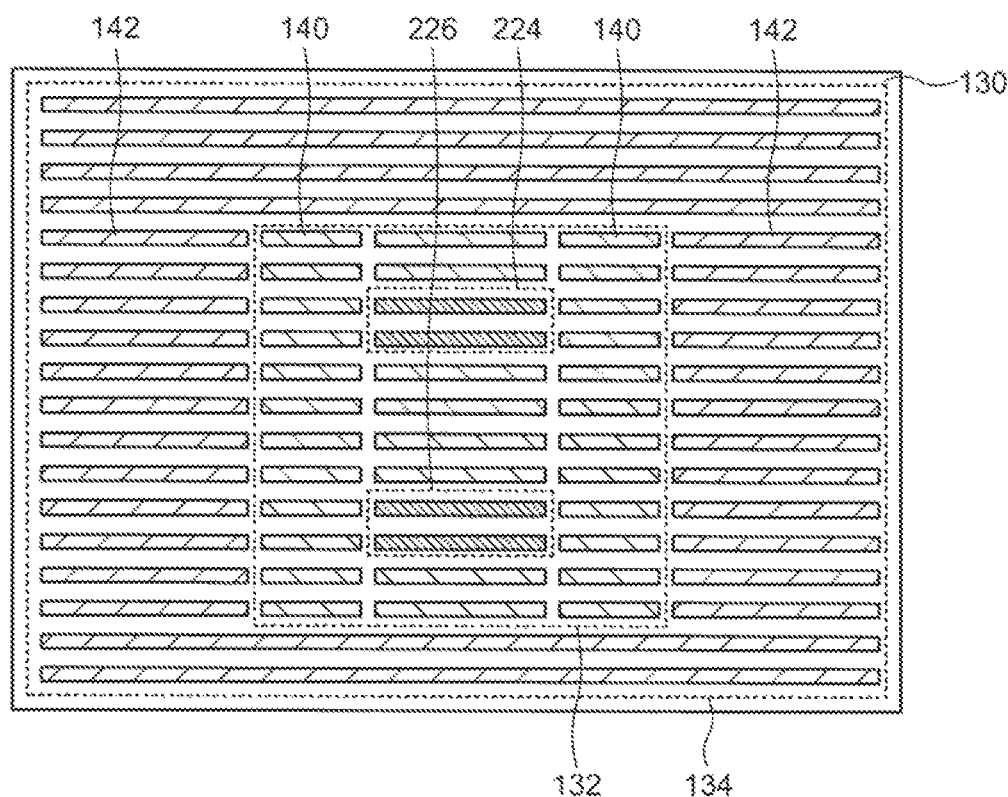
FIG. 22B is a schematic top view of a light source of an illumination device according to an embodiment of the present invention.

As described in the First Embodiment, there is no restriction on the number of regions provided to the first substrate 122 and the second substrate 130. Therefore, in a modified example, a fifth region 220 and a sixth region 222 may be further provided to the first substrate 122, and a seventh region 224 and an eighth region 226 respectively overlapping the fifth region 220 and the sixth region 222 may be provided to the second substrate 130 as shown in FIG. 22A and FIG. 22B. In this modified example, the fifth region 220 and the sixth region 222 are surrounded by the first region 124, and the seventh region 224 and the eighth region 226 are surrounded by the third region 132. When the first region 124 and the third region 132 remain in the non-driving state while the other regions are driven, the light passing through the first region 124 and the third region 132 travels linearly, providing an illuminated area with high illuminance on the illuminated plane 104. Thus, it is possible to express relatively complex figures such as numbers.

2. Modified Example 2

Figure 23:
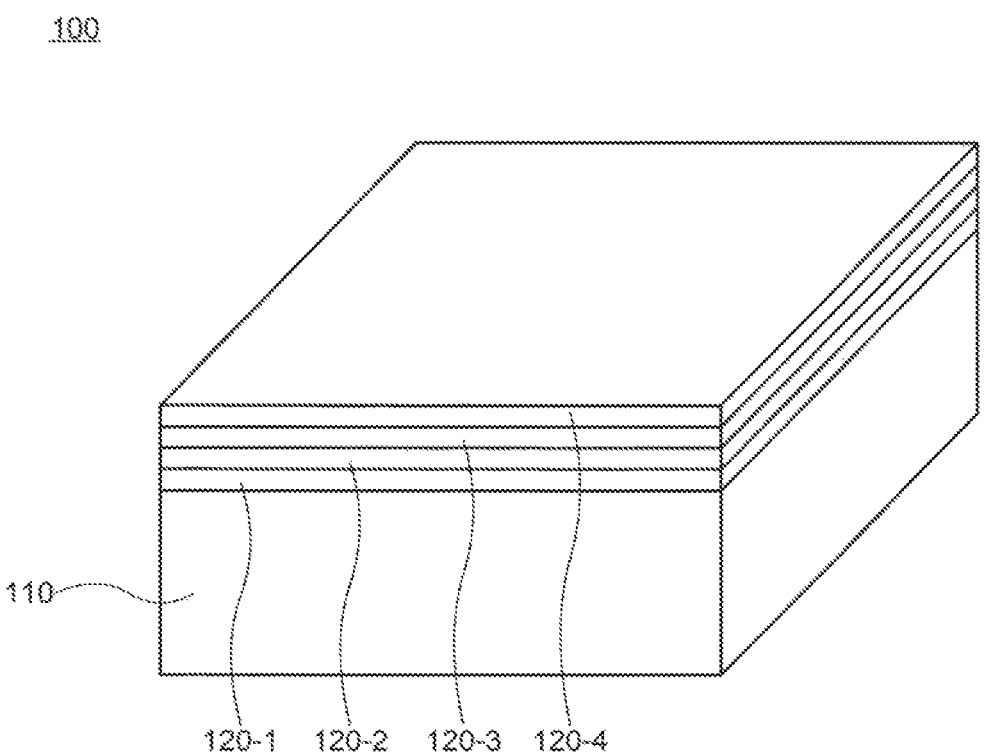
FIG. 23 is a schematic perspective view of an illumination device according to an embodiment of the present invention.

In addition to the first liquid crystal cell 120-1 and the second liquid crystal cell 120-2, the illumination device 100 may have an additional plurality of liquid crystal cells 120 over the second liquid crystal cell 120-2. There is no restriction on the number of layers of liquid crystal cells 120, and the number may be equal to or more than 2 and equal to or less than 10, equal to or more than 2 and equal to or less than 6, or equal to or more than 2 and equal to or less than 4. Preferably, the total number of liquid crystal cells 120 is even. FIG. 23 demonstrates an example in which a third liquid crystal cell 120-3 and a fourth liquid crystal cell 120-4 are mounted over the second liquid crystal cell 120-2.

Figure 24A:
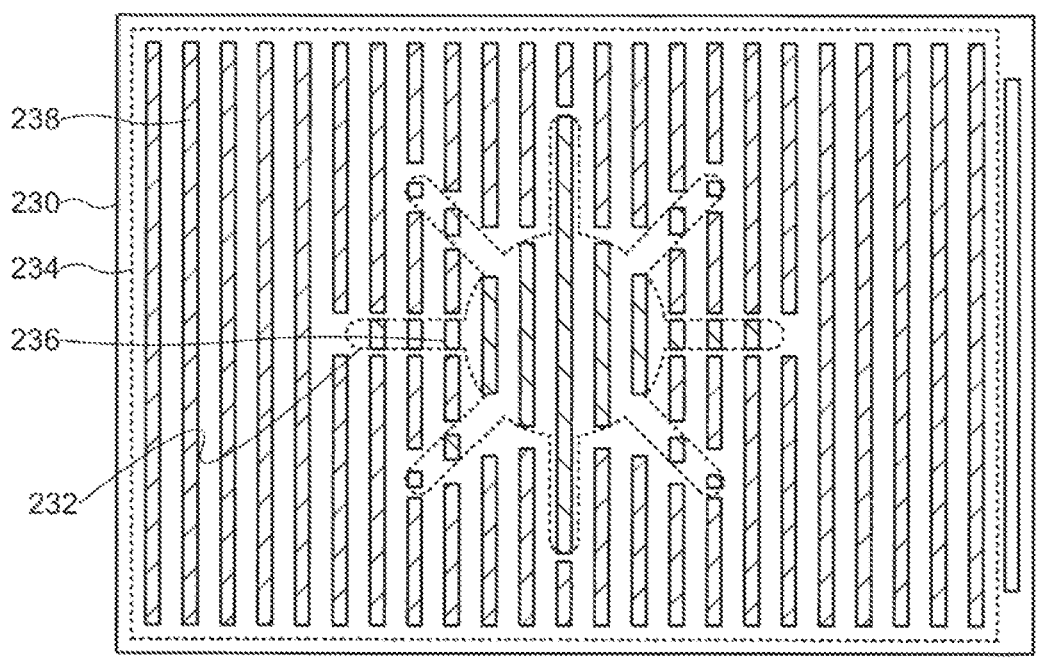
FIG. 24A is a schematic top view of an illumination device according to an embodiment of the present invention.
Figure 24B:
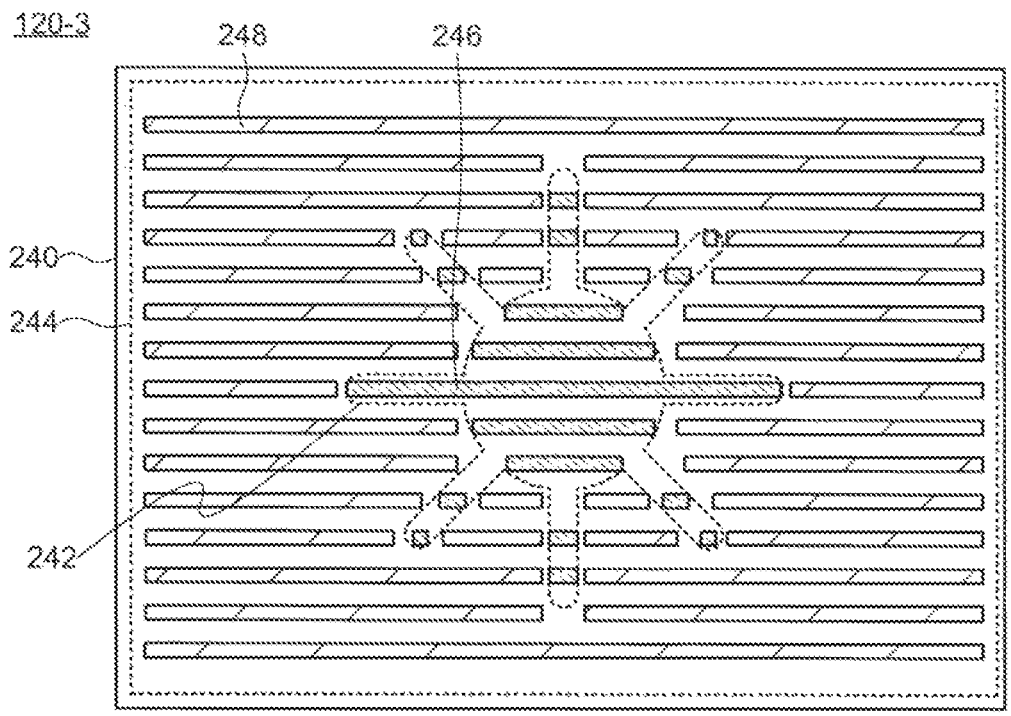
FIG. 24B is a schematic top view of an illumination device according to an embodiment of the present invention.

When the total number of liquid crystal cells 120 exceeds 2, the shapes of the regions respectively demarcated on the first substrate 122 and the second substrate 130 of each of the first liquid crystal cell 120-1 and the second liquid crystal cell 120-2 may be different from the shapes of the regions respectively demarcated on the first substrate 122 and the second of the other liquid crystal cells 120. For example, in the case where the illumination device 100 has the third liquid crystal cell 120-3 and the fourth liquid crystal cell 120-4 in addition to the first liquid crystal cell 120-1 and the second liquid crystal cell 120-2 (FIG. 23), the first substrate 230 of the liquid crystal cell 120-3 may be provided with a ninth region 232 and a tenth region 234 having different shapes than the first region 124 and the second region 126 of the first liquid crystal cell 120-1 (FIG. 24A). A plurality of first lower electrodes 236 and a plurality of second lower electrodes 238 may be selectively formed in these ninth region 232 and tenth region 234, respectively. Similarly, the second substrate 240 of the third liquid crystal cell 120-3 may be provided with an eleventh region 242 and a twelfth region 244 having different shapes than the first region 124 and the second region 126 of the first liquid crystal cell 120-1. The shapes of the eleventh region 242 and the twelfth region 244 may be the same as those of the ninth region 232 and the tenth region 234, respectively. A plurality of first upper electrodes 246 and a plurality of second upper electrodes 248 may be selectively disposed in the eleventh region 242 and the twelfth region 244, respectively. The same is applied to the fourth liquid crystal cell 120-4, and thus, an explanation is omitted.

Since the first lower electrodes 236 and the second lower electrodes 238 respectively correspond to the first lower electrodes 136 and the second lower electrodes 138 of the first liquid crystal cell 120-1 and the second liquid crystal cell 120-2, the same driving method as that for the first lower electrodes 136 and the second lower electrodes 138 may be applied. Similarly, since the first upper electrodes 246 and the second upper electrodes 248 respectively correspond to the first upper electrodes 140 and the second upper electrodes 142 of the first liquid crystal cell 120-1 and the second liquid crystal cell 120-2, the same driving method as that for the first upper electrodes 140 and the second upper electrodes 142 may be applied. Although a detailed explanation of the driving method is omitted, the third liquid crystal cell 120-3 and the fourth liquid crystal cell 120-4 are driven as appropriate. More specifically, the third liquid crystal cell 120-3 and the fourth liquid crystal cell 120-4 are driven while remaining the first liquid crystal cell 120-1 and the second liquid crystal cell 120-2 in the non-driving state, by which a pattern reflecting the shapes of the ninth region 232 to the twelfth region 244 can be expressed on the illuminated plane 104. Similarly, the first liquid crystal cell 120-1 and the second liquid crystal cell 120-2 are driven while remaining the third liquid crystal cell 120-3 and the fourth liquid crystal cell 120-4 in the non-driving state, by which a pattern reflecting the shapes of the first region 124 to the eighth region 226 can be expressed on the illuminated plane 104.

The liquid crystal cells 120 are configured so that the patterns expressed by one pair of liquid crystal cells (here, the first liquid crystal cell 120-1 and the second liquid crystal cell 120-2) and by another pair of liquid crystal cells (here, the third liquid crystal cell 120-3 and the fourth liquid crystal cell 120-4) are different from each other, by which a plurality of patterns can be expressed on the illuminated plane 104.

3. Modified Example 3

An illumination device 250 according to this modified example differs from the illumination device 100 described in the First Embodiment in that, as shown in the schematic developed view in FIG. 25, a single upper electrode 252 is provided to the second substrate 130 in at least one of the liquid crystal cells 120 and that this upper electrode 252 is arranged so as to overlap the plurality of regions formed on the first substrate 122. The upper electrode 252 overlaps the plurality of first lower electrodes 136 and the plurality of second lower electrodes 138.

In the illumination device 250, the refractive-index distribution of the liquid crystal layer 154 occurs only on the first substrate 122 side. Therefore, as can be understood from FIG. 14, the first liquid crystal cell 120-1 and the second liquid crystal cell 120-2 are preferably arranged so that the extending direction of the plurality of first lower electrodes 136 or the plurality of second lower electrodes 138 is different from each other between the first liquid crystal cell 120-1 and the second liquid crystal cell 120-2 in order to diffuse the light in both the x direction and the y direction.

Although not illustrated, a single lower electrode may be provided over the first substrate 122, and the plurality of first upper electrodes 140 and the plurality of second upper electrodes 142 may be provided on the second substrate 130 side. In this case, the first liquid crystal cell 120-1 and the second liquid crystal cell 120-2 are also preferably arranged so that the extending direction of the plurality of first upper electrodes 140 or the plurality of second upper electrodes 142 is different from each other between the first liquid crystal cell 120-1 and the second liquid crystal cell 120-2 in order to diffuse the light in both the x direction and the y direction.

Although not illustrated, no electrodes may be placed on the second substrate 130 side. In this case, the plurality of first lower electrodes 136 and the plurality of second lower electrodes 138 are respectively disposed in the first region 124 and the second region 126 over the first substrate 122. Since the refractive-index distribution of the liquid crystal layer 154 occurs only on the first substrate 122 side, the first liquid crystal cell 120-1 and the second liquid crystal cell 120-2 are preferably arranged so that, as can be understood from FIG. 14, the extending direction of the plurality of first lower electrodes 136 or the plurality of second lower electrodes 138 is different from each other between the first liquid crystal cell 120-1 and the second liquid crystal cell 120-2 in order to diffuse the light in both the x direction and the y direction.

Alternatively, no electrodes may be placed on the first substrate 122 side. In this case, the plurality of first upper electrodes 140 and the plurality of second upper electrodes 142 are respectively disposed in the third region 132 and the fourth region 134 of the second substrate 130. In this case, the first liquid crystal cell 120-1 and the second liquid crystal cell 120-2 are also preferably arranged so that the extending direction of the plurality of first upper electrodes 140 or the plurality of second upper electrodes 142 is different from each other between the first liquid crystal cell 120-1 and the second liquid crystal cell 120-2 in order to diffuse the light in both the x direction and the y direction.

In any of the above-described modified examples 1 to 3, since the refractive-index distribution can be formed in the liquid crystal layer 154, a pattern reflecting the shapes of the plurality of regions provided on each substrate can be expressed on the illuminated plane 104. Therefore, similar to the illumination device 100 according to the First Embodiment, it is possible to provide illumination devices capable of expressing a variety of patterns without an increase in power consumption. The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. An illumination device comprising:
   a light source;
   a first liquid crystal cell over the light source; and
   a second liquid crystal cell over the first liquid crystal cell,
   wherein each of the first liquid crystal cell and the second liquid crystal cell comprises:
      a first substrate having a first region and a second region;
      a plurality of first lower electrodes located over the first region and extending in a column direction;
      a plurality of second lower electrodes located over the second region and extending in the column direction;
      a first liquid crystal layer over the plurality of first lower electrodes and the plurality of second lower electrodes; and
      a second substrate over the first liquid crystal layer,
   the plurality of first lower electrodes and the plurality of second lower electrodes are configured to be driven independently from each other, and
   the illumination device is configured so that, in each of the first liquid crystal cell and the second liquid crystal cell,
      an alternating voltage is applied to the plurality of first lower electrodes so that a phase thereof is inverted between the first lower electrodes adjacent in a row direction intersecting the column direction, and
      an alternating voltage is applied to the plurality of second lower electrodes so that a phase thereof is inverted between the second lower electrodes adjacent in the row direction.

2. The illumination device according to claim 1,
   wherein the first regions overlap with each other and have the same shape between the first liquid crystal cell and the second liquid crystal cell.

3. The illumination device according to claim 1,
   wherein, in each of the first liquid crystal cell and the second liquid crystal cell, the first region is surrounded by the second region.

4. The illumination device according to claim 1,
   wherein, in each of the first liquid crystal cell and the second liquid crystal cell, at least one of the plurality of first lower electrodes overlaps with and is sandwiched by two of the plurality of second lower electrodes in the column direction.

5. The illumination device according to claim 1,
   wherein each of the first liquid crystal cell and the second liquid crystal cell further comprises:
      a first orientation film between the first liquid crystal layer and the plurality of first lower electrodes and between the first liquid crystal layer and the plurality of second lower electrodes; and
      a second orientation film between the first liquid crystal layer and the second substrate, and
   an orientation direction of the first orientation film intersects the column direction and an orientation direction of the second orientation film.

6. The illumination device according to claim 1,
   wherein each of the first liquid crystal cell and the second crystal cell further comprises a single upper electrode between the first liquid crystal layer and the second substrate.

7. The illumination device according to claim 1,
   wherein, in each of the first liquid crystal cell and the second crystal cell, the second substrate has a third region and a fourth region respectively overlapping the first region and the second region, and
   each of the first liquid crystal cell and the second crystal cell further comprises:
      a plurality of first upper electrodes located under the third region and extending in a row direction intersecting the column direction; and
      a plurality of second upper electrodes located under the fourth region and extending in the row direction.

8. The illumination device according to claim 7 configured so that, in each of the first liquid crystal cell and the second crystal cell,
   an alternating voltage is applied to the plurality of first upper electrodes so that a phase thereof is inverted between the first upper electrodes adjacent in the column direction, and
   an alternating voltage is applied to the plurality of second upper electrodes so that a phase thereof is inverted between the second upper electrodes adjacent in the column direction.

9. The illumination device according to claim 7,
   wherein the third regions overlap with each other and have the same shape between the first liquid crystal cell and the second liquid crystal cell.

10. The illumination device according to claim 7,
    wherein, in each of the first liquid crystal cell and the second liquid crystal cell, the first region and the third region overlap with each other and have the same shape.

11. The illumination device according to claim 1, further comprising:
    a third liquid crystal cell over the second liquid crystal cell; and
    a fourth liquid crystal cell over the third liquid crystal cell,
    wherein each of the third liquid crystal cell and the fourth liquid crystal cell comprises:
       a third substrate having a fifth region and a sixth region;
       a plurality of third lower electrodes located over the fifth region and extending in the column direction;
       a plurality of fourth lower electrodes located over the sixth region and extending in the column direction;
       a second liquid crystal layer over the plurality of third lower electrodes and the plurality of fourth lower electrodes; and
       a fourth substrate over the second liquid crystal layer, and
    the plurality of third lower electrodes and the plurality of fourth lower electrodes are configured to be driven independently from each other.

12. The illumination device according to claim 11 configured so that, in each of the third liquid crystal cell and the fourth liquid crystal cell,
an alternating voltage is applied to the plurality of third lower electrodes so that a phase thereof is inverted between the third lower electrodes adjacent in a row direction intersecting the column direction, and
an alternating voltage is applied to the plurality of fourth lower electrodes so that a phase thereof is inverted between the fourth lower electrodes adjacent in the row direction.

13. The illumination device according to claim 11, wherein the first region of the first substrate of the first liquid crystal cell or the second liquid crystal cell is different in shape from the fifth region of the third substrate of the third liquid crystal cell or the fourth liquid crystal cell.

14. The illumination device according to claim 11, wherein the fifth regions of the third substrates overlap with each other and have the same shape between the third liquid crystal cell and the fourth liquid crystal cell.

15. The illumination device according to claim 11, wherein, in each of the third liquid crystal cell and the fourth liquid crystal cell, at least one of the plurality of third lower electrodes overlaps with and is sandwiched between two of the plurality of fourth lower electrodes.

16. The illumination device according to claim 11, wherein each of the third liquid crystal cell and the fourth liquid crystal cell further comprises:
a third orientation film between the second liquid crystal layer and the plurality of third lower electrodes and between the second liquid crystal layer and the plurality of fourth lower electrodes; and
a fourth orientation film between the second liquid crystal layer and the fourth substrate, and
an orientation direction of the third orientation film intersects the column direction and an orientation direction of the fourth orientation film.

17. The illumination device according to claim 11, wherein each of the third liquid crystal cell and the fourth liquid crystal cell further comprises a single upper electrode between the second liquid crystal layer and the fourth substrate.

18. The illumination device according to claim 11, wherein, in each of the third liquid crystal cell and the fourth liquid crystal cell, the fourth substrate has a seventh region and an eighth region respectively overlapping the fifth region and the sixth region, and
each of the third liquid crystal cell and the fourth liquid crystal cell further comprises:
a plurality of third upper electrodes located under the seventh region, arranged in a stripe shape, and extending in a row direction intersecting the column direction; and
a plurality of fourth upper electrodes located under the eighth region, arranged in a stripe shape, and extending in the row direction.

19. An optical element comprising:
a first substrate having a first region and a second region;
a plurality of first lower electrodes located over the first region and extending in a column direction;
a plurality of second lower electrodes located over the second region and extending in the column direction;
a liquid crystal layer over the plurality of first lower electrodes and the plurality of second lower electrodes;
a second substrate opposing the first substrate through the liquid crystal layer and having a third region and a fourth region respectively overlapping the first region and the second region;
a plurality of first upper electrodes located under the third region and extending in a row direction; and
a plurality of second upper electrodes located under the fourth region and extending in the row direction,
wherein the plurality of first lower electrodes, the plurality of second lower electrodes, the plurality of first upper electrodes, and the plurality of second upper electrodes are configured to be driven independently from each other.

20. An illumination device comprising:
a light source;
a first liquid crystal cell over the light source; and
a second liquid crystal cell over the first liquid crystal cell,
wherein each of the first liquid crystal cell and the second liquid crystal cell comprises:
a first substrate having a first region and a second region;
a plurality of first lower electrodes located over the first region and extending in a column direction;
a plurality of second lower electrodes located over the second region and extending in the column direction;
a first liquid crystal layer over the plurality of first lower electrodes and the plurality of second lower electrodes; and
a second substrate over the first liquid crystal layer,
the plurality of first lower electrodes and the plurality of second lower electrodes are configured to be driven independently from each other, and
in each of the first liquid crystal cell and the second liquid crystal cell, at least one of the plurality of first lower electrodes overlaps with and is sandwiched by two of the plurality of second lower electrodes in the column direction.

21. An illumination device comprising:
a light source;
a first liquid crystal cell over the light source; and
a second liquid crystal cell over the first liquid crystal cell,
wherein each of the first liquid crystal cell and the second liquid crystal cell comprises:
a first substrate having a first region and a second region;
a plurality of first lower electrodes located over the first region and extending in a column direction;
a plurality of second lower electrodes located over the second region and extending in the column direction;
a first liquid crystal layer over the plurality of first lower electrodes and the plurality of second lower electrodes;
a second substrate over the first liquid crystal layer;
a first orientation film between the first liquid crystal layer and the plurality of first lower electrodes and between the first liquid crystal layer and the plurality of second lower electrodes; and
a second orientation film between the first liquid crystal layer and the second substrate,
the plurality of first lower electrodes and the plurality of second lower electrodes are configured to be driven independently from each other, and
an orientation direction of the first orientation film intersects the column direction and an orientation direction of the second orientation film.

* * * * *